US012566426B2

(12) United States Patent
Carrara et al.

(10) Patent No.: US 12,566,426 B2
(45) Date of Patent: *Mar. 3, 2026

(54) INDUSTRIAL DESIGN ENVIRONMENT AUTOMATION CONTROLLER PROGRAM CONVERSION AND EXPORT

(71) Applicant: Rockwell Automation Technologies, Inc., Mayfield Heights, OH (US)

(72) Inventors: Anthony Carrara, Strongsville, OH (US); Lorenzo P. Majewski, Waukesha, WI (US); Christopher E. Stanek, Willoughby, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 676 days.

This patent is subject to a terminal disclaimer.

(21) Appl. No.: 18/060,100

(22) Filed: Nov. 30, 2022

(65) Prior Publication Data

US 2024/0176332 A1 May 30, 2024

(51) Int. Cl.
*G05B 19/418* (2006.01)

(52) U.S. Cl.
CPC .............................. *G05B 19/41835* (2013.01)

(58) Field of Classification Search
USPC .................................................. 717/140–151
See application file for complete search history.

(56) References Cited

U.S. PATENT DOCUMENTS

| | | | |
|---|---|---|---|
| 6,981,226 B2 | 12/2005 | Schmitt et al. | |
| 7,627,860 B2 * | 12/2009 | Kodosky ................. | H04L 67/02 |
| | | | 717/174 |
| 7,791,671 B2 * | 9/2010 | Schultz ................ | H04N 23/662 |
| | | | 348/211.6 |
| 7,836,122 B2 | 11/2010 | Edwards et al. | |
| 8,041,435 B2 | 10/2011 | Plache et al. | |
| 8,060,834 B2 | 11/2011 | Lucas et al. | |

(Continued)

FOREIGN PATENT DOCUMENTS

EP          1 213 633 A1      6/2002

OTHER PUBLICATIONS

Zhang et al, "The Application of Industrial Automation Computer Control System", IEEE, pp. 1-4 (Year: 2022).*

(Continued)

*Primary Examiner* — Anil Khatri
(74) *Attorney, Agent, or Firm* — Amin, Turocy & Watson, LLP

(57) ABSTRACT

An industrial integrated development environment (IDE) supports decoupled development of industrial control programs without requiring the programs to be initially bound to a specific industrial controller. The IDE system allows industrial control programs to be defined as smart objects within an industrial control project. These smart objects can be created without an initial binding to an industrial controller, and can subsequently be assigned to selected industrial controllers after development of the control programs is complete, or while program development is in progress. The IDE system can export executable content allocated to a selected controller definition as a project file formatted to be compatible with a configuration application specific to the controller type of the selected controller definition.

20 Claims, 21 Drawing Sheets

(56) References Cited

U.S. PATENT DOCUMENTS

| | | | | |
|---|---|---|---|---|
| 8,185,892 | B2 | 5/2012 | Lucas et al. | |
| 8,818,757 | B2 | 8/2014 | Plache et al. | |
| 8,898,633 | B2 | 11/2014 | Bryant et al. | |
| 8,914,794 | B2 | 12/2014 | Bliss et al. | |
| 9,342,278 | B2 * | 5/2016 | Petzoldt | G06F 8/34 |
| 10,275,265 | B1 | 4/2019 | Gould et al. | |
| 10,592,260 | B1 | 3/2020 | Gould et al. | |
| 10,754,667 | B1 * | 8/2020 | Cu-Unjieng | G05B 19/0426 |
| 11,314,493 | B1 * | 4/2022 | Stump | G06F 11/3698 |
| 11,520,571 | B2 * | 12/2022 | Mathews | G06F 8/71 |
| 11,726,457 | B2 | 8/2023 | Stump et al. | |
| 12,079,652 | B2 * | 9/2024 | Dunn | H04L 63/0272 |
| 12,261,799 | B2 * | 3/2025 | Venugopal | H04L 5/0053 |
| 2007/0129814 | A1 | 6/2007 | Dionne | |
| 2016/0026457 | A1 | 1/2016 | Scheidel et al. | |
| 2017/0357249 | A1 | 12/2017 | Sandler et al. | |
| 2019/0146435 | A1 | 5/2019 | Brandes et al. | |
| 2020/0103850 | A1 | 4/2020 | Stump et al. | |
| 2021/0096704 | A1 | 4/2021 | Ericsson et al. | |
| 2021/0096824 | A1 | 4/2021 | Stump et al. | |
| 2022/0299982 | A1 * | 9/2022 | Stump | G05B 19/4183 |
| 2022/0334807 | A1 | 10/2022 | Rai et al. | |
| 2024/0176320 | A1 | 5/2024 | Carrara et al. | |

OTHER PUBLICATIONS

Soufian, "Towards Self-Defending Control Systems in Cybersecurity Analysis and Measures in Industrial Automation Systems", IEEE, pp. 1-6 (Year: 2017).*

Diaz et al, "A Smart Factory Architecture Based on Industry 4.0 Technologies: Open-Source Software Implementation", IEEE, pp. 1-23 (Year: 2023).*

Faul et al, "Approach to Interconnect Existing Industrial Automation Systems with the Industrial Internet", IEEE, pp. 1-4 (Year: 2016).*

Khaniabadi et al, "Edge-AI Technologies for Real-Time Industrial Object Identification and Tracking: An Overview", IEEE, 1-7 (Year: 2025).*

Extended European Search Report received for European Patent Application Serial No. 23212262.2 dated Apr. 18, 2024, 10 pages.

Notice of Allowance received for U.S. Appl. No. 18/060,090, dated Apr. 4, 2024, 52 pages.

Gupta, Ashutosh, "Toward a Smart Object-based Application and thus Reusability", IEEE, Feb. 13-15, 2020, pp. 112-114.

Fischer et al., "Reuse Assessment of IEC 61131-3 Control Software Modules Using Metrics—An Industrial Case Study", IEEE, 2021, 8 pages.

Extended European Search Report received for European Patent Application Serial No. 23212258.0 dated May 6, 2024, 7 pages.

Extended European Search Report received for European Patent Application Serial No. 23212563.3 dated May 2, 2024, 7 pages.

Extended European Search Report received for European Patent Application Serial No. 23212557.5 dated May 2, 2024, 7 pages.

Non-Final Office Action received for U.S. Appl. No. 18/060,031 dated Apr. 22, 2025, 12 pages.

Notice of Allowance received for U.S. Appl. No. 18/060,031 dated Jul. 1, 2025, 9 pages.

* cited by examiner

CONTROL PROJECT DEVELOPMENT AND DEPLOYMENT
SINGLE-CONTROLLER DEVELOPMENT

202

204 — DEFINE SINGLE CONTROLLER FOR THE CONTROL PROJECT

206 — WRITE CONTROL PROGAM FOR THE DEFINED CONTROLLER

208 — COMPILE AND EXPORT CONTROL PROGRAM TO THE CONTROLLER

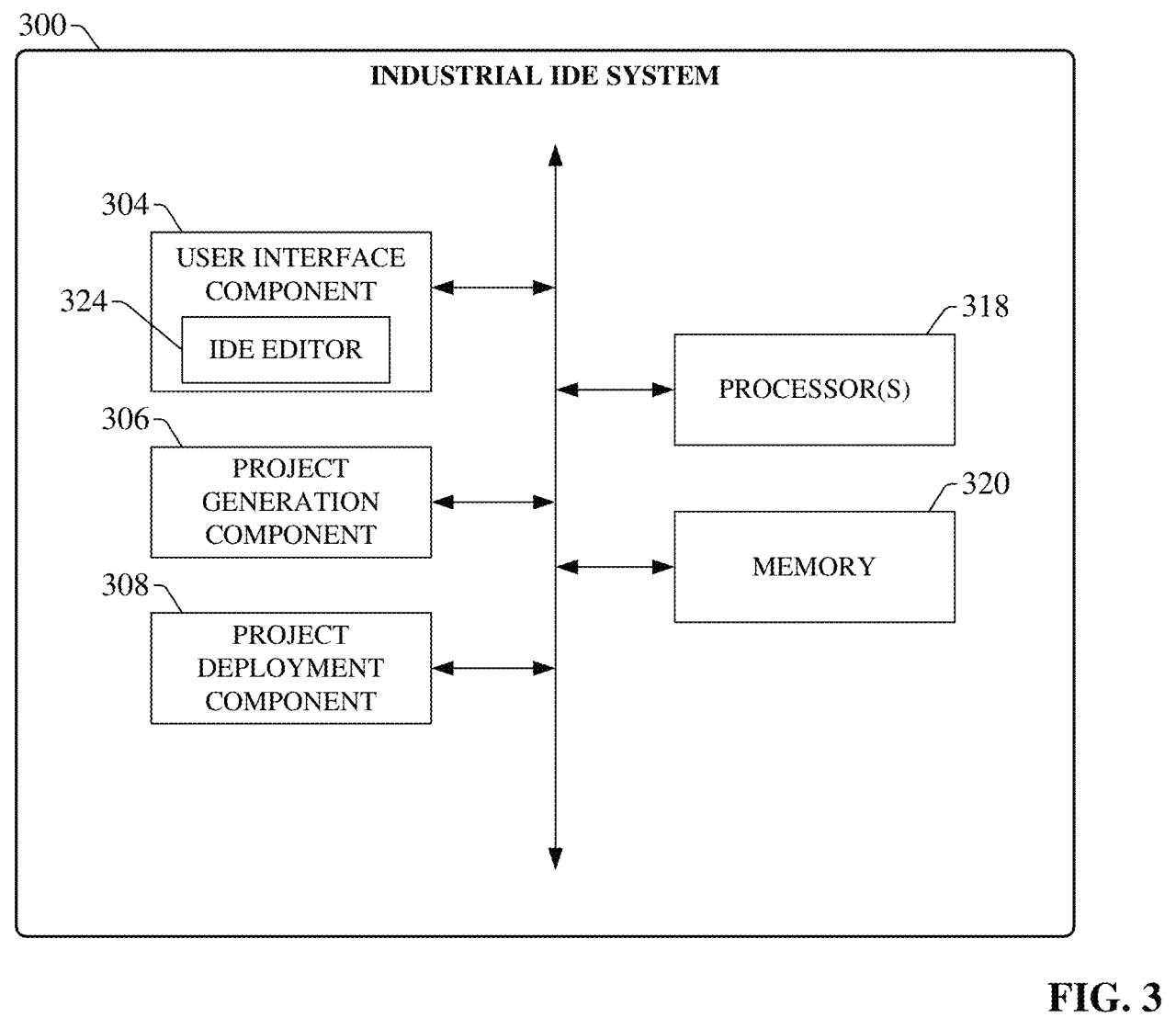

INDUSTRIAL IDE SYSTEM

300

USER INTERFACE COMPONENT
304

IDE EDITOR
324

PROJECT GENERATION COMPONENT
306

PROJECT DEPLOYMENT COMPONENT
308

PROCESSOR(S)
318

MEMORY
320

FIG. 3

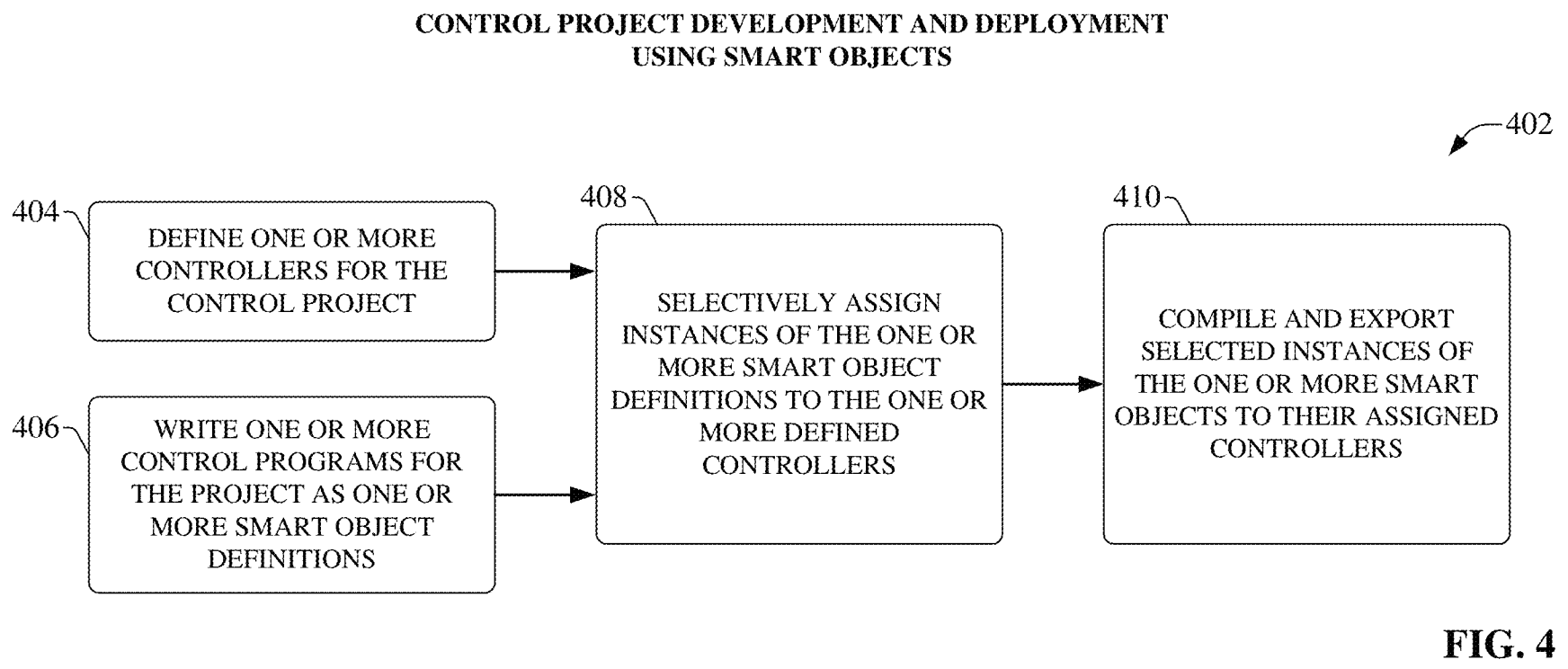

CONTROL PROJECT DEVELOPMENT AND DEPLOYMENT
USING SMART OBJECTS

402

404

DEFINE ONE OR MORE CONTROLLERS FOR THE CONTROL PROJECT

406

WRITE ONE OR MORE CONTROL PROGRAMS FOR THE PROJECT AS ONE OR MORE SMART OBJECT DEFINITIONS

408

SELECTIVELY ASSIGN INSTANCES OF THE ONE OR MORE SMART OBJECT DEFINITIONS TO THE ONE OR MORE DEFINED CONTROLLERS

410

COMPILE AND EXPORT SELECTED INSTANCES OF THE ONE OR MORE SMART OBJECTS TO THEIR ASSIGNED CONTROLLERS

FIG. 4

CONTROL PROJECT
502
SMART OBJECT
BINDING
DEFINITIONS
504
CONTROLLER
DEFINITIONS
508
CONTROLLER MODEL
I/O DEFINITIONS
NETWORK SETTINGS
SMART OBJECT
DEFINITIONS
506
CONTROL ROUTINES
DATA TAGS
CHILD SO DEFINITIONS
FIG. 5

INDUSTRIAL DESIGN ENVIRONMENT AUTOMATION CONTROLLER PROGRAM CONVERSION AND EXPORT

TECHNICAL FIELD

The subject matter disclosed herein relates generally to industrial automation systems, and, for example, to industrial programming development platforms.

BACKGROUND ART

Control program development platforms typically support a workflow whereby a given control project—comprising the industrial control program to be executed on an industrial controller and any relevant device settings for the controller—is created for a single industrial controller, to which the project is bound at an early stage of project development. Since there is typically a one-to-one relationship between a control project and the industrial controller for which the project is being developed (that is, only a single controller can be defined for the control project), the developer initially defines the controller for which the control project is being developed. Once the controller has been defined, the developer writes the control program that is to be executed on the controller. When development of the control program is complete, the program is compiled and exported to the physical industrial controller for execution.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a user interface component configured to render a project development interface and to receive, via interaction with the project development interface, design input that defines an industrial control program and controller definitions as part of an industrial control project, wherein the controller definitions represent respective industrial controllers; a project generation component configured to create, based on the design input, a smart object definition that represents the industrial control program, and allocate, in accordance with smart object allocation input received via interaction with the project development interface, multiple instances of the smart object definition to respective multiple controller definitions of the controller definitions; and a project deployment component configured to, in response to receipt of an instruction to export executable content associated with a controller definition, of the multiple controller definitions, translate an instance, of the multiple instances, allocated to the controller definition to a project file capable of being opened, viewed, and edited in a controller configuration application specific to a type of industrial controller defined by the controller definition.

Also, one or more embodiments provide a method, comprising receiving, by a system comprising a processor via interaction with a project development interface, control programming input that defines an industrial control program; defining, by the system as part of an industrial control project, a smart object definition representing the industrial control program based on the control programming input; receiving, by the system via interaction with the project development interface, controller definition input that defines properties of multiple industrial controllers; storing, by the system as part of the industrial control project, the controller definition input as controller definitions that respectively represent the multiple industrial controllers; assigning, in accordance with smart object allocation input received via interaction with the project development interface, multiple instances of the smart object definition to respective multiple controller definitions of the controller definitions; receiving, by the system, selection of a controller definition, of the multiple controller definitions, whose content is to be exported; and in response to the receiving of the selection, generating, by the system, a project file comprising the industrial control program defined by an instance, of the multiple instances, allocated to the controller definition, wherein the generating comprises generating the project file in a format capable of being opened, viewed, and edited in a controller configuration application compatible with a type of industrial controller defined by the controller definition.

Also, according to one or more embodiments, a non-transitory computer-readable medium is provided having stored thereon instructions that, in response to execution, cause a system to perform operations, the operations comprising receiving, via interaction with a project development interface, design input that defines an industrial control program and controller definitions as part of an industrial control project, wherein the controller definitions define properties of respective industrial controllers; creating, by the system as part of an industrial control project, a smart object definition representing the industrial control program based on the design input; assigning, in accordance with smart object allocation input received via interaction with the project development interface, instances of the smart object definition to selected controller definitions of the controller definitions; receiving an instruction to export content associated with a selected controller definition of the controller definitions; and in response to the receiving of the instruction, translating an instance, of the multiple instances, allocated to the selected controller definition to a project file capable of being opened, viewed, and edited in a controller configuration application specific to a type of industrial controller defined by the controller definition To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 3 is a block diagram of an example integrated development environment (IDE) system.

FIG. 4 is a flowchart illustrating a control project development workflow supported by embodiments of the industrial IDE system.

FIG. 5 is a representation of an example control project that can be generated by embodiments of the industrial IDE system.

DETAILED DESCRIPTION

Figure 1:
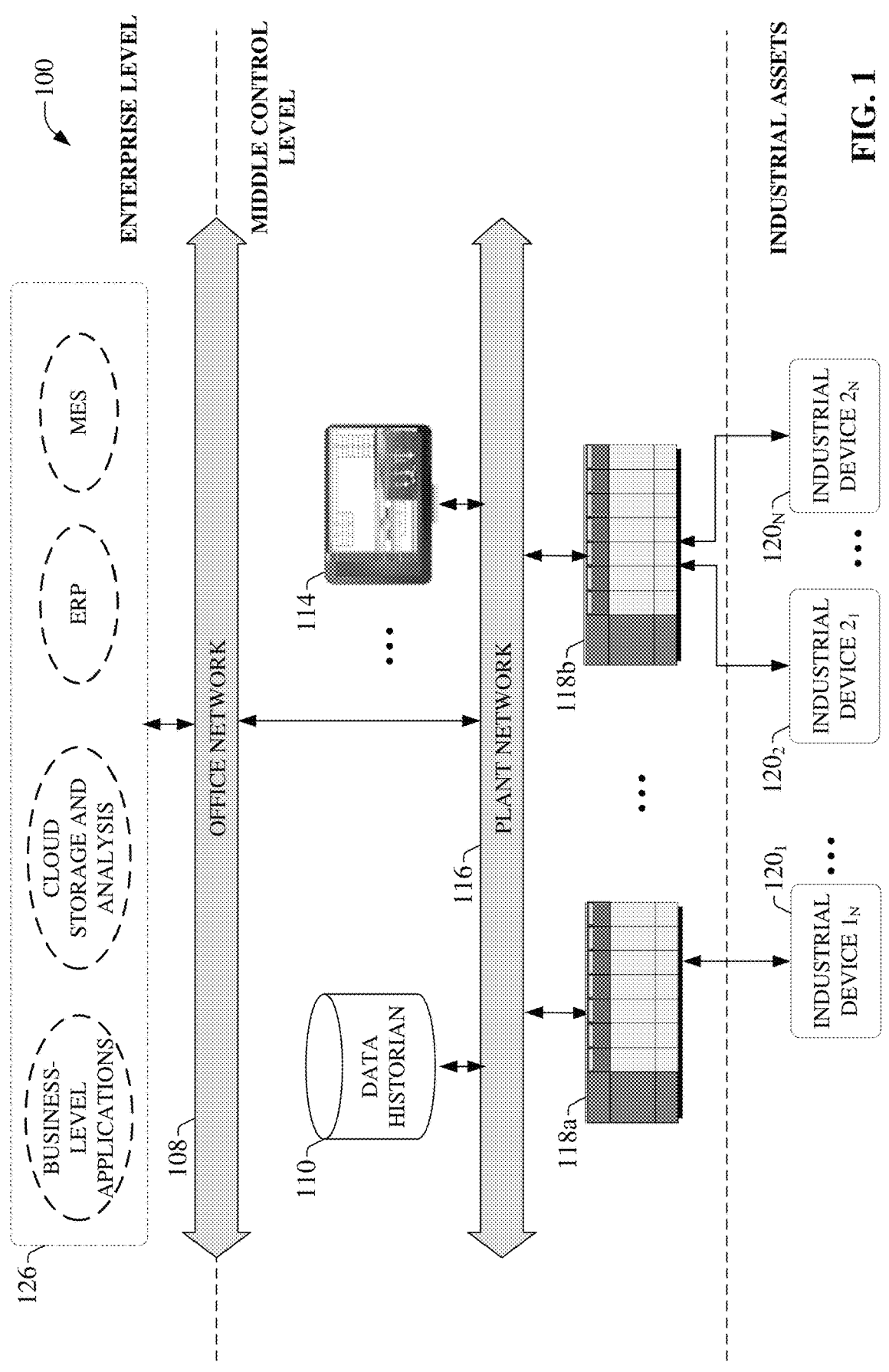
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledge-bases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using configuration applications specific to each device. For example, industrial controllers 118 are typically configured and programmed using a control programming development application such as a ladder logic editor. Using such development platforms, a designer can write control programming (e.g., ladder logic, structured text, function block diagrams, etc.) for carrying out a desired industrial sequence or process and download the resulting program files to the controller 118.

Figure 2:
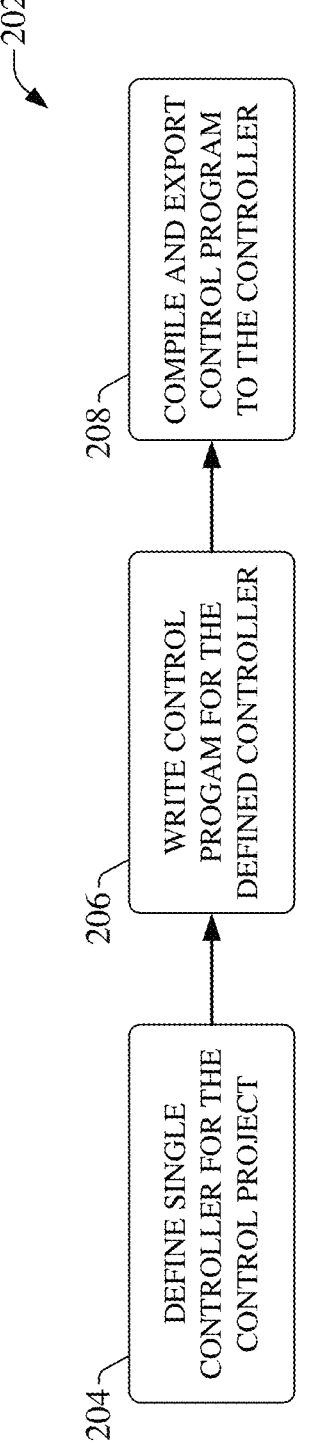
FIG. 2 is a flowchart illustrating a typical workflow for developing industrial control programs and exporting those programs to an industrial controller.

FIG. 2 is a flowchart 202 illustrating the typical workflow for developing industrial control programs and downloading those programs to an industrial controller. Control program development platforms typically support a workflow whereby a given control project—comprising the industrial control program to be executed on the controller 118 and any relevant device settings for the controller 118—is created for a single industrial controller 118, to which the project is bound at an early stage of project development. Accordingly, as an initial step (step 204), the developer defines the controller 118 for which the control project is being developed. This may involve selecting the model of the controller, defining the controller's local and remote I/O modules, defining the controller's network settings, or specifying other such controller properties and settings. Once the controller 118 has been defined, the user writes the control program that is to be executed on the controller 118 (step 206). Depending on the programming format supported by the development platform, the control program may be written as ladder logic, a function block diagram, sequential function charts, structured text, or another format. When development of the control program is complete, the program is compiled and exported to the physical industrial controller 118 for execution (step 208).

The necessity to define the binding between the industrial control program and its target industrial controller 118 at the outset of the control program development workflow creates an inflexibility in the development process, particularly in scenarios in which the desired control functionality is known but the hardware implementation of the target control system is yet to be determined. The development approach outlined in FIG. 2 also limits the ability to scale a given control program across multiple different controllers 118 that are to carry out similar monitoring and control functionality, since a given control project can only be bound to a single controller 118.

To address these and other issues, one or more embodiments described herein provide an industrial integrated development environment (IDE) system that supports decoupled development of industrial control programs without requiring the programs to be initially bound to a specific industrial controller. Instead, the IDE system allows industrial control programs to be defined and stored as smart objects within an industrial control project. These smart objects can be created and stored without an initial binding to an industrial controller, and can subsequently be assigned to selected industrial controllers after development of the control programs is complete (or while program development is in progress). A given smart object can be reused and deployed to multiple industrial controllers, providing a simple means to implement common control functionality on multiple different automation systems. To allow for deployment of smart objects to selected controllers, the IDE system supports creation of a control project having a one-to-many relationship with industrial controllers, such that multiple controllers can be defined within a single project. This is in contrast the one-to-one relationship between a control project and its associated industrial controller supported by development platforms that support the workflow depicted in FIG. 2. A control project created using the IDE system can thus serves as a single platform for managing multiple industrial controllers 118.

FIG. 3 is a block diagram of an example integrated development environment (IDE) system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 302 can include a user interface component 304 including an IDE editor 324, a project generation component 306, a project deployment component 308, one or more processors 318, and memory 320. In various embodiments, one or more of the user interface component 304, project generation component 306, project deployment component 308, the one or more processors 318, and memory 320 can be electrically and/or communicatively coupled to one another to perform one or more of the functions of the IDE system 302. In some embodiments, components 304, 306, and 308, can comprise software instructions stored on memory 320 and executed by processor(s) 318. IDE system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

User interface component 304 can be configured to receive user input and to render output to the user in any suitable format (e.g., visual, audio, tactile, etc.). In some embodiments, user interface component 304 can be configured to communicatively interface with an IDE client that executes on a client device (e.g., a laptop computer, tablet computer, smart phone, etc.) that is communicatively connected to the IDE system 302 (e.g., via a hardwired or wireless connection). The user interface component 304 can then receive user input data and render output data via the IDE client. In other embodiments, user interface component 304 can be configured to generate and serve suitable interface screens to a client device (e.g., program development screens), and exchange data via these interface screens. Input data that can be received via various embodiments of user interface component 304 can include, but is not limited to, programming code, controller definition data, binding definitions that specify bindings between smart objects and industrial controllers, or other such input. Output data rendered by various embodiments of user interface component 304 can include program code, programming feedback (e.g., error and highlighting, coding suggestions, etc.), programming and visualization development screens, project testing results, etc.

Project generation component 306 can be configured to create a system project comprising one or more project files based on design input received via the user interface component 304. Project deployment component 308 can be configured to translate smart objects or portions of smart objects to executable control code that can be exported to, and executed on, selected industrial controllers. In some embodiments, the project deployment component 308 can convert content of a smart object to a format that can be opened and viewed within another industrial control development platform.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

FIG. 4 is a flowchart 402 illustrating a control project development workflow supported by embodiments of the industrial IDE system 302. In contrast to workflow depicted in FIG. 2, rather than requiring a controller 118 to be defined as an initial step (step 204 in FIG. 2) before allowing control programming to be written for the defined controller (step 206 in FIG. 2), the workflow supported by IDE system 302 allows one or more control programs to be written (at step 406) independently of the controller definition (step 404). At step 406, one or more industrial control programs can be defined for the current control project, and these control programs—including their data tag definitions and control routines—are stored as deployable smart object definitions. As a separate independent step 404, one or more industrial controllers 118 can be defined for the project. Once one or more smart objects and one or more industrial controllers have been defined, the developer can selectively assign instances of a selected smart object definition to one or more of the defined industrial controllers at step 408. This creates a binding between the selected smart object (or portions of the smart object) and the one or more industrial controllers. Finally, at step 410, the selected instances of the one or more smart objects are compiled and exported to their assigned controllers based on the binding definitions created at step 408.

FIG. 5 is a representation of an example control project 502 that can be generated by embodiments of the industrial IDE system 302. Via interaction with the IDE system's development interface (to be illustrated and described in more detail below), the user can create a control project 502 comprising multiple smart object definitions 506. Each smart object definition 506 comprises industrial control code (e.g., ladder logic routines or other types of control programming) and associated data tag definitions. The user may also define hierarchical parent-child relationships between smart object definitions 506 if desired. These parent-child definitions create functional relationships between the control code associated with the respective smart objects.

In addition, the user can create one or more controller definitions 508 as part of the control project 502. Each controller definition 508 can specify an industrial controller 118 in terms of the vendor and model number of the controller, a user-defined name or identifier for the controller 118, the digital and analog I/O associated with the controller 118 (including configuration information for the controller's local and remote I/O modules), functions supported by the controller 118, a processing or storage capacity of the controller 118, or other such controller properties and functions. The user can also assign informational metadata to any of the controller definitions 508 to record such information as the location of the controller 118 (e.g., an industrial facility, a production area, a geographic location, an automation system identifier, etc.), a process to be monitored and controlled by the controller 118, or other such user-defined information.

Once one or more smart object definitions 506 and one or more controller definitions 508 have been created, the user can selectively assign instances of any of the smart object definitions 506 to any of the controller definitions 508, thereby creating smart object bindings between the smart object definitions 506 and the controller definitions 508. These bindings are stored as part of the control project 502 as smart object binding definitions 504.

Figure 6:
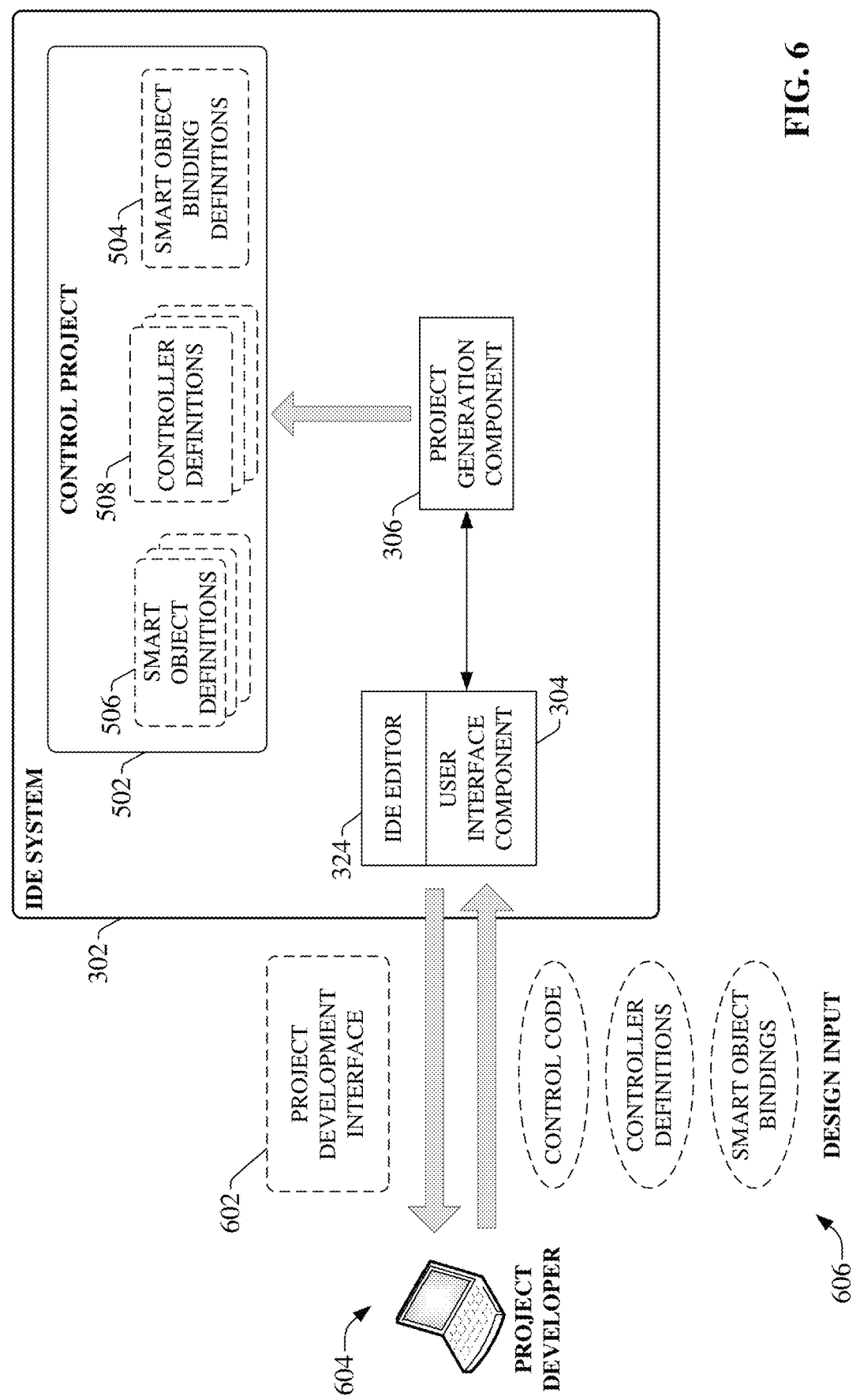
FIG. 6 is a diagram illustrating example data flows associated with creation of a control project using the industrial IDE system.

FIG. 6 is a diagram illustrating example data flows associated with creation of a control project 502 using IDE system 302 according to one or more embodiments. A client device 604 (e.g., a laptop computer, tablet computer, desktop computer, mobile device, wearable AR/VR appliance, etc.) can access the IDE system's project development tools and leverage these tools to create a control project 502. Some embodiments of the IDE system 302 may execute on a cloud platform or another web-based platform as a set of cloud-based services, allowing multiple users to access the IDE system 302 via remote connections and facilitating collaborative development of control projects 302. Alternatively, some embodiments of the IDE system 302 can execute on an on-premise server accessible to authorized users, or locally on the client device 604 itself.

User interface component 304 can serve a project development interface 602 to the client device 604. This project development interface 602 acts as the development platform for creating control projects 502. Through interaction with the project development interface 602, developers can submit design input 606 to the IDE system 302, including instructions to initiate creation of a new control project 502, control code (e.g., ladder logic programming, function block diagram programming, structured text, etc.), controller definitions, smart object binding definitions, and other such design input 606. The project generation component 306 generates the control project 502 based on the design input 606 submitted by the user. As noted above, the resulting control project 502 comprises one or more smart object definitions 506, controller definitions 508, and smart object binding definitions 504.

Each smart object definition 506 comprises one or more industrial control programs or routines that are translatable to control code that can be executed on an industrial controller 118, as well as any data tags associated with the control programs (e.g., integer tags, Boolean tags, real tags, string tags, digital and analog I/O tags etc.). Upon creation, a smart object definition 506 is not initially bound to a specific controller definition 508. The control programming and data tags that make up a smart object definition 506 can be developed and edited without being bound to a specific industrial controller. This allows a user to develop industrial control programs in a controller-agnostic manner without preliminary knowledge of the specific industrial controller on which the programs will execute.

Figure 7:
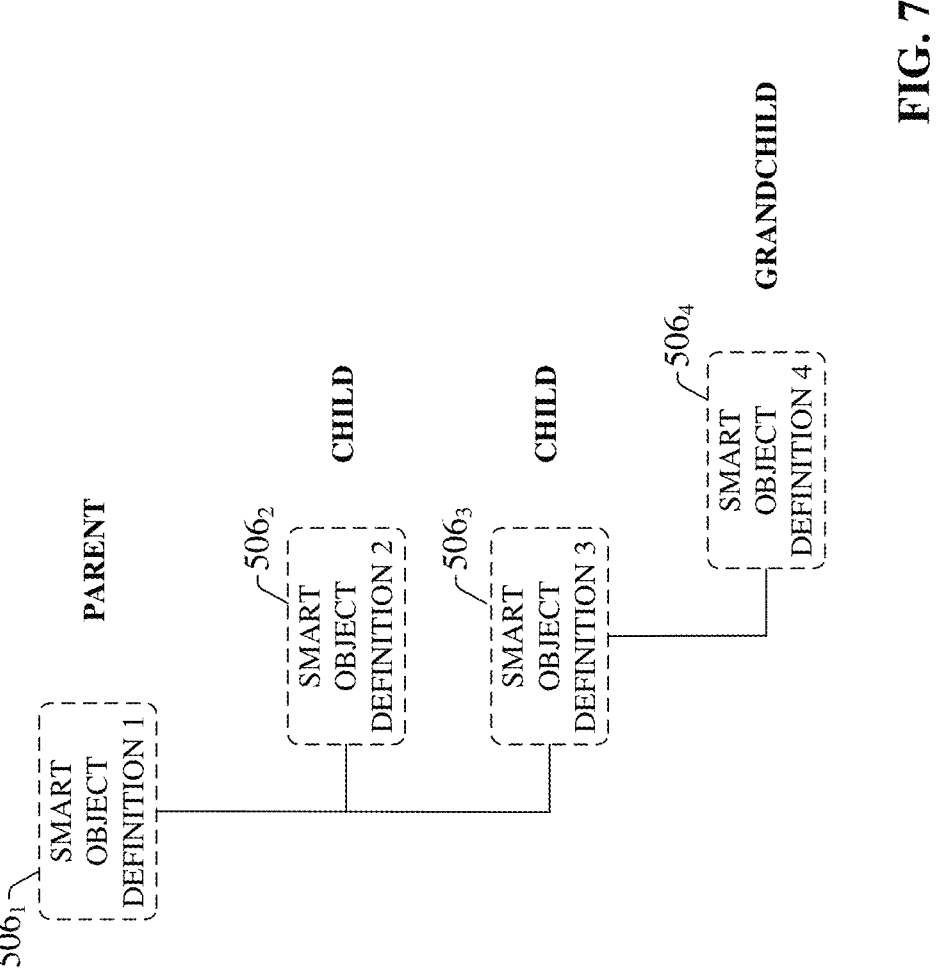
FIG. 7 is a representation of an example set of smart object definitions for which a set of hierarchical relationships have been defined.

Some embodiments of the IDE system 302 also allow a user to define hierarchical parent-child relationships between smart object definitions 506. These relationships can be specified as part of the smart object definitions 506 themselves. For example, as part of a smart object definition 506 for a first smart object, the user can specify one or more second smart object definitions 506 that are to be designated child smart objects of the first smart object. FIG. 7 is a representation of an example set of smart object definitions 506 for which a set of hierarchical relationships have been defined. In this example, smart object definition 506₁ is a parent object having two child smart object definitions 506₂ and 506₃. In addition, smart object definition 506₃ has an associated child smart object definition 506₄, making smart object definition 506₄ a grandchild of the parent smart object definition 506₁.

These hierarchical relationships can dictate inheritance of smart object attributes between smart objects definitions 506. For example, a smart object definition 506₁ having one or more child smart object definitions 506₂, 506₃ will inherit the control programs or routines defined in those child smart object definitions 506₂. 506₃. The parent smart object definition 506₁ will also inherit any child smart object definitions (e.g., 506₄) of any of its direct child smart object definitions 506. These inheritances affect the scope of content that is allocated to an industrial controller 118 when an instance of a smart object definition 506 is assigned to the controller 118. For example, when an instance of a smart object definition 506 having one or more child smart objects is assigned to an industrial controller 118, the project generation component 306 assigns the control programming associated with the parent smart object definition 506 as well as the programming associated with the child smart object definitions 506 to the controller 118.

Figure 8:
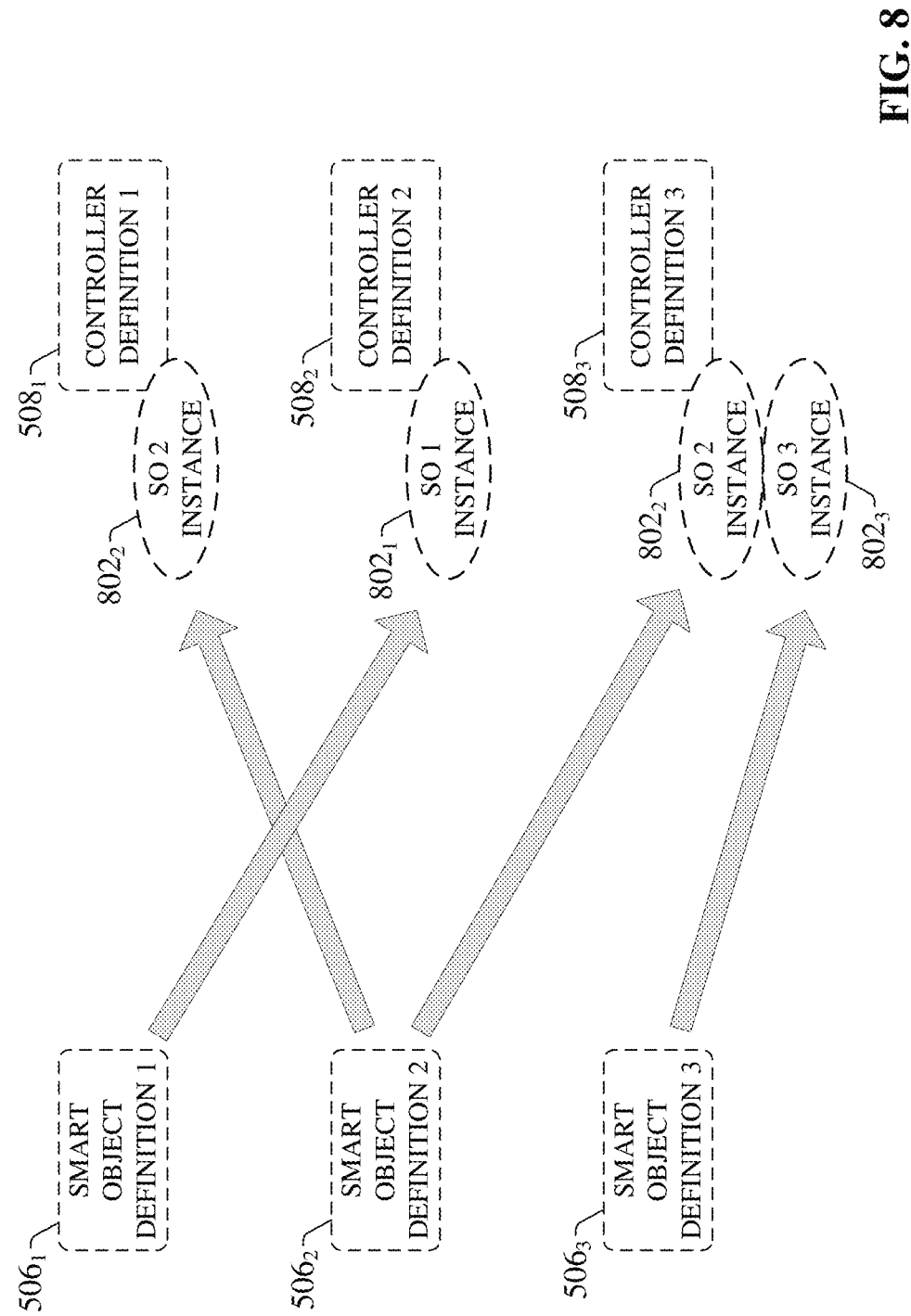
FIG. 8 is a diagram illustrating allocation of smart object instances to selected controller definitions.

As noted above, smart object definitions 506 are initially unbound to a specific industrial controller 118. Once created, an instance of a smart object definition 506 can be allocated to a selected controller definition 508 created within the control project 502. FIG. 8 is a diagram illustrating allocation of smart object instances 802 to selected controller definitions 508. In this example, the user individually assigns each of three smart object definitions 506₁. 506₂, and 506₃ to one or more of three available controller definitions 508₁, 508₂, and 508₃ (which each represent a specific hardware controller 118). Specifically, smart object definition 506₁ has been assigned to controller definition 508₂, smart object definition 506₂ has been assigned to both controller definition 508₁ and controller definition 508₃, and smart object definition 506₃ has been assigned to controller definition 508₃.

Each instance 802 of a given smart object definition 506 represents a distinct instantiation or copy of its base smart object definition 506. When an instance 802 of a smart object definition 506 is assigned to a controller definition 508, the control program routines and associated data tags defined by the smart object definition 506 are allocated to the controller definition 508, and the smart object binding definitions 504 are updated to record this user-defined binding between the smart object definition 506 and the controller definition 508.

As illustrated in FIG. 8, the IDE system 302 allows multiple instances 802 of a single smart object definition 506—e.g., smart object definition 506₂ in FIG. 8—to be allocated to respective multiple controller definitions 508. Assigning multiple instances 802 of a smart object definition 506 to multiple different controller definitions 508 establishes that each of the physical controllers 118 represented by the controller definitions 508 is to be allocated a copy of the control programming and data tag definitions defined by the smart object definition 506. The project generation component 306 records these program allocations as part of the control project 502—e.g., as smart object binding definitions 504—based on the user's selective assignment of smart object instances 802. By supporting the ability to allocate individual instances 802 of each smart object definition 506 to any number of controller definitions 508, the IDE system 302 allows a given smart object definition 506—including its associated control programming and data tag definitions—to be easily reused and scaled across multiple controllers 118. This can simplify controller programming workflows in scenarios in which similar control functionality is to be applied to multiple separate automation systems.

Moreover, a given controller definition 508—such as controller definition 508₃ in FIG. 8—may be assigned instances 802 of multiple different smart object definitions 506, thereby allocating the control programs and data tag definitions of those multiple smart object definitions 506 to the same industrial controller 118.

In some embodiments, the IDE editor 324 can enforce constraints on allocation of smart object instances 802 that prevent incompatible bindings between smart object definitions 506 and controller definitions 508. These constraints can ensure that the controller definition 508 to which an instance 802 of a smart object definition 506 is assigned supports the hardware or software functionality required to carry out control functions defined by the smart object definition 506. For example, a control program routine defined by a smart object definition 506 may include motion control instructions, and therefore can only be executed by industrial controllers 118 having motion control capability. Accordingly, if the user attempts to allocate an instance 802 of the smart object definition 506 to a controller definition 508 representing a controller 118 that does not support motion control, the user interface component 304 can render a notification indicating that the selected controller definition 508 is not capable of executing the motion control functions defined by the smart object definition 506. In various embodiments, the IDE editor 324 may prevent the binding between the smart object definition 506 and the controller definition 508. Alternatively, the editor 324 may provisionally permit the binding to allow the user to subsequently modify the controller definition 508 to reflect a compatible controller 118 capable of supporting the smart object's functional requirements (e.g., a controller 118 that supports motion control).

The IDE editor 324 can perform similar validation checks to verify that the selected controller definition 508 has a sufficient number of each type of I/O point (e.g., analog and digital inputs, analog and digital outputs, etc.) required by the control programs and data tags defined by the smart object definition 506, or to verify other compatibility factors. When the user attempts to create an invalid binding, the warning notification generated by the user interface component 304 can identify aspects of the smart object definition 506 that cannot be executed on the selected controller. Example notifications can identify specific instructions defined in the control program that cannot be executed by the selected controller (e.g., motion control instructions that are not supported by the controller 118), display a comparison of the number of I/O points of a given type required by the control program against the number of I/O points of the given type available on the controller 118 (as determined by the controller definition 508, etc.), or convey other types of information that can assist the user in correcting the incompatibility.

While the examples described above consider scenarios in which development of a smart object definition 506 is completed before an instance 802 of the smart object definition 506 is allocated to a controller definition 508, the IDE editor 324 can also allow the user to specify an intended target controller definition 508 for a smart object definition 506 while development of the smart object definition 506 is still in progress. If the user pre-selects an intended target controller definition 508 for a smart object definition 506 that is in the process of being developed, the IDE editor 324 can leverage knowledge of the capabilities of the specified target controller definition 508 to provide real-time design feedback to the user during development of the smart object definition 506. For example, as the user is creating the smart object definition 506—e.g., by entering control programming and association instructions, as well as data tag definitions—the IDE editor 324 can verify, in real-time, that the smart object properties and functionalities being entered by the user are compatible with the selected target controller definition 508. This can include verifying that a control program instruction or function entered by the user as part of the smart object definition 506 is supported by the target controller given the controller's functional capabilities, verifying that the smart object definition's I/O requirements do not exceed the available I/O defined in the controller definition 508 for each I/O type, or performing other such compatibility verifications.

Allowing the user to specify an intended controller definition 508 for which a smart object definition 506 is being developed, prior to completing development of the smart object definition 506, can assist the user in proactively avoiding controller incompatibility issues while developing smart object definitions 506 by applying controller-specific validation rules to the development process, thereby preventing the user from adding control programming or capabilities to the smart object definition 506 that are not supported by the intended target controller 118. Pre-specifying an intended controller definition 508 for a smart object definition 506 does not require subsequent binding of the completed smart object definition 506 to that controller definition 508. Instead, the IDE editor 324 permits the user to allocate instances 802 of the smart object definition 506 to a different controller definition 508 if desired. If the user chooses to allocate an instance 802 of the smart object definition 506 to a controller definition 508 other than the originally specified target controller definition 508, the IDE editor 324 will perform an updated validation on the smart object definition 506 to ensure that the capabilities defined in the smart object definition 506 are supported by the selected controller definition 508, and the user interface component 304 will render a warning notification if a function of the smart object definition 506 is not supported by the new controller definition 508, as described above.

Figure 9:
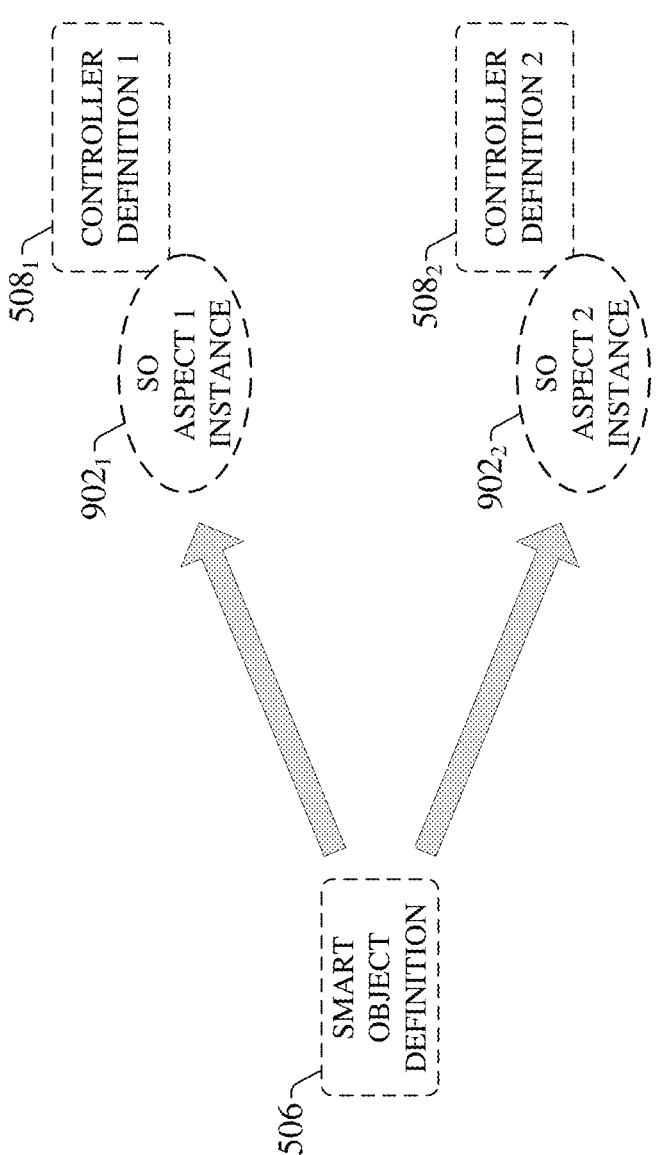
FIG. 9 is a diagram illustrating allocation of different aspects of a smart object definition to respective different controller definitions as instances of those aspects.

The example smart object allocations illustrated in FIG. 8 depict each smart object definition 506 being allocated to one or more controller definitions 508 in its entirety as an instance 802 of the smart object definition 506. Some embodiments of the IDE system 302 can also allow the user to distribute different aspects of a single smart object definition 506 to respective different controller definitions 508 as instances of those aspects. FIG. 9 is a diagram illustrating allocation of different aspects of a smart object definition 506 to respective different controller definitions 508 as instances 902 of those aspects. In an example scenario, a smart object definition 506 may comprise multiple control routines or subroutines of an industrial control program. These different routines, or groupings of the routines, can be considered aspects of the smart object definition 506. If desired, the user can assign a first subset of these routines—that is, a number of routines less than the total number of routines defined in the smart object definition 506—to a first controller definition 508₁ as a first aspect instance 9021, and second subset of the routines can be assigned to a second controller definition 508₂ as a second aspect instance 9022. Although the example illustrated in FIG. 9 depicts a distribution of a smart object's aspects across only two controller definitions 508, the IDE system 302 allows the user to distribute aspects of a smart object definition 506 across any number of controller definitions 508.

Distributing aspects of a smart object definition 506 across multiple controller definitions 508 in this manner allows the developer to easily configure a distributed control system in which different monitoring and control functions defined in the smart object definition 506 are carried out by respective different industrial controllers 118. As in previous examples, the IDE editor 324 can perform validation checks on the allocation of an aspect instance 902 to ensure that the selected target controller definitions 508 are capable of executing their respective aspect instances 902. Moreover, if different aspects of a single smart object definition 506 are allocated to respective different controller definitions 508, the IDE editor 324 can track the allocations of the different smart object aspects to determine whether all aspects of the smart object definition 506 have been assigned to a controller definition 508. In some cases, it may not be necessary to allocate all aspects of a given smart object definition 506 to a controller definition 508. In other cases, a smart object's functionality may not execute properly unless all of the smart object's aspects are allocated to a controller. In either case, the user interface component 304 can render notifications at selected times—e.g., when an aspect of the smart object definition 506 is allocated to a controller definition 508, or when the user attempts to deploy control programming to a physical controller 118—informing the user that some aspects of a smart object definition 506 have not yet been allocated to a controller definition 508, thereby affording the user an opportunity to verify whether the non-allocated aspects of the smart object definition 506 should be allocated to a controller definition 508.

Also, in some embodiments, the IDE editor 324 can enforce a restriction on distributed allocation of different aspects of a smart object definition 506 by ensuring that each aspect can only be assigned to a single controller definition 508 at a time. This restriction may be appropriate when different aspects of a single smart object definition 506 are distributed among multiple controllers 118, since such scenarios may imply that control of an automation system is to be coordinated between multiple controllers 118, and as such each unit of functionality defined in the smart object definition 506 should be assigned to only one controller 118.

Figure 10:
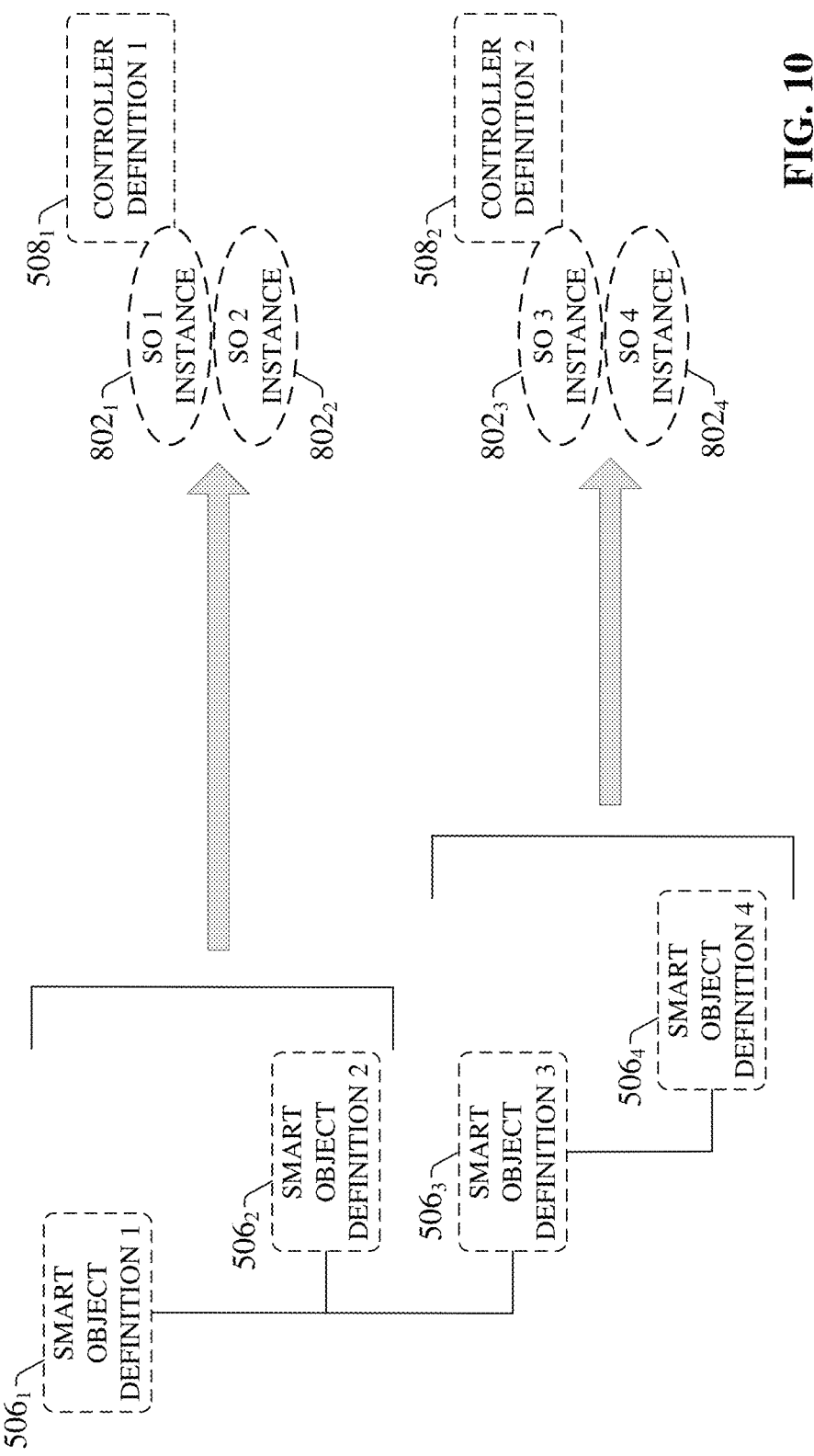
FIG. 10 is a diagram illustrating allocation of different portions of a smart object hierarchy to respective different controller definitions.

When an instance 802 of a smart object definition 506 having one or more defined child smart object definitions 506, as illustrated in FIG. 7, is allocated to a controller definition 508, the control functionality associated with that smart object definition 506 as well as the control functionality associated with each of the child smart object definitions 506 are assigned to the controller definition 508 by virtue of inheritance. Alternatively, the IDE editor 324 allows the user to allocate separate subsets of the smart object hierarchy to respective different controller definitions 508. FIG. 10 is a diagram illustrating allocation of different portions of a smart object hierarchy to respective different controller definitions 508. Similar to the example depicted in FIG. 7, the example collection of smart object definitions 506 depicted in FIG. 10 comprises a parent smart object definition 506₁ having two associated child smart object definitions 506₂ and 503₂, as well as one grandchild smart object definition 506₄ (a child of smart object definition 506₃). The IDE editor 324 allows the user to assign all of these related smart object definitions 506₁-506₄ to a single controller definition 508₁, or to assign different subsets of these related smart object definitions 506₁-506₄ to respective different controller definitions 508. In the example allocation depicted in FIG. 10, smart object definitions 506₁ and 506₂ have been allocated to a first controller definition 508₁ as instances 8021 and 8022, and smart object definitions 506₃ and 506₃ have been allocated to a second controller definition 508₂ as instances 8023 and 8024.

Returning to FIG. 6, the project generation component 306 records the user-defined allocations between smart object definitions 506 and controller definitions 508 as smart object binding definitions 504, which are stored as part of the control project 502. These smart object binding definitions 504 are visually represented in the project development interface 602 in a variety of ways to allow the user to review the smart object bindings, and are used by the IDE system 302 to control how the control functionality defined by the smart object definitions 506 are exported to the physical controllers 118 or to external control development platforms.

Figure 11:
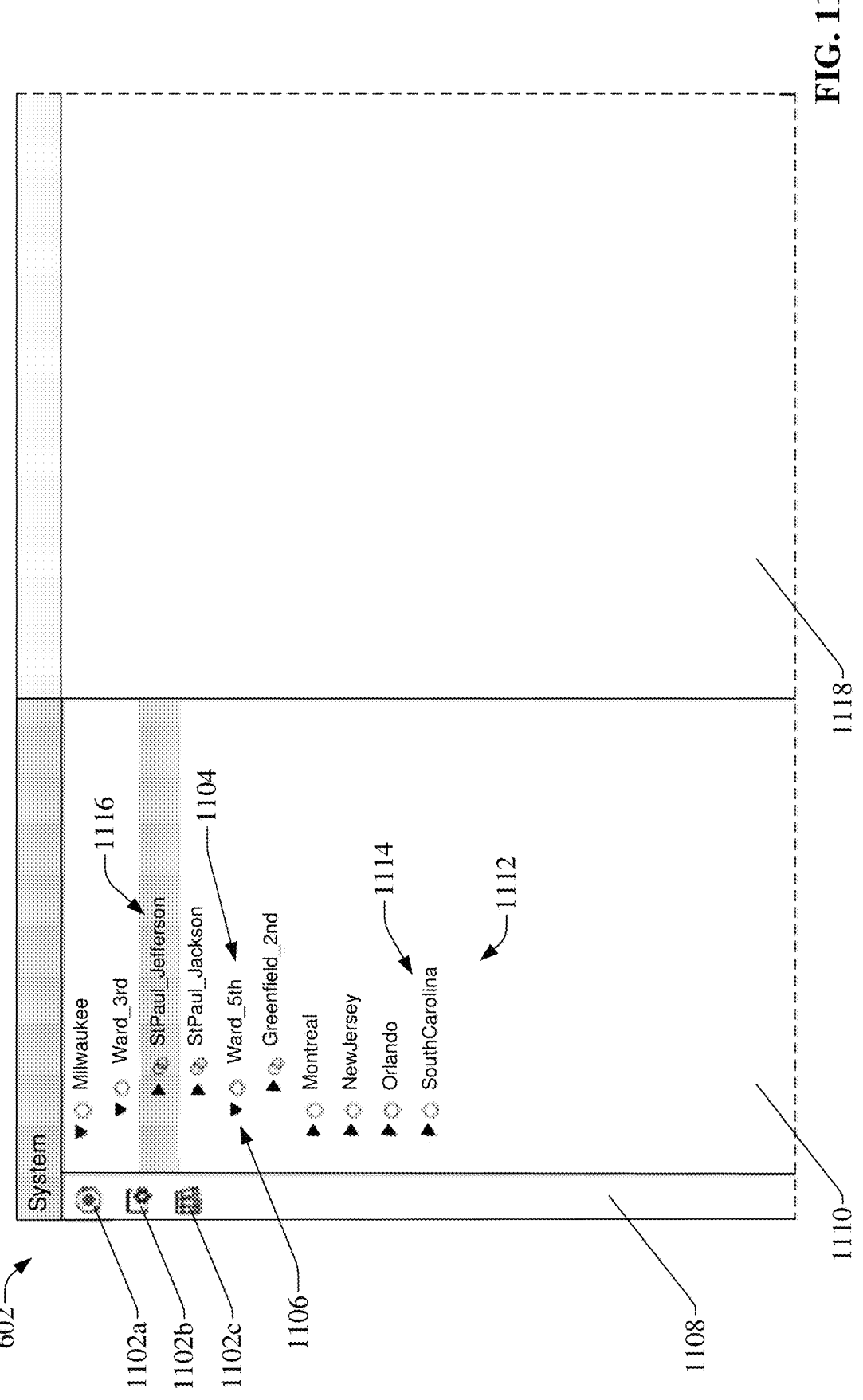
FIG. 11 is a segment of an example project development interface that can be rendered by one or more embodiments of the industrial IDE system's user interface component, on which a System view has been selected.

FIGS. 11-15 are views of example project development interfaces 602 that can be rendered on a client device 604 by the user interface component 304, and which provide tools for creating smart object definitions 506, controller definitions 508, and smart object binding definitions 504 as described above. FIG. 11 is a segment of an example project development interface 602 that can be rendered by one or more embodiments of the industrial IDE system's user interface component 304, on which a System view has been selected. Development interface 602 is organized into panels and workspaces, and includes interactive development tools that assist a user in developing smart object definitions 506 and controller definitions 508, and allocating instances 802 of the smart object definitions 506 to selected controller definitions 508.

The basic structure of project development interface 602 comprises a workspace canvas 1118 and an explorer panel 1110 pinned to the left of the workspace canvas 1118. Explorer panel 1110 serves as a means for navigating and viewing content of a control project 502. The Explorer panel 1110 itself supports a number of different viewing categories, which are represented by selectable explorer icons 1102 rendered on an explorer view control bar 1108 pinned to the left-side edge of the Explorer panel 1110. Selection of an explorer icon 1102 determines one or both of the type of project content to be browsed via the Explorer panel 1110 or a format in which the browsable project content is rendered on the Explorer panel 1110.

The explorer icons 1102 include a System View explorer icon 1102a, an Execution View explorer icon 1102b, and a Library View explorer icon 1102c. In the scenario depicted in FIG. 11, the user has selected the System View explorer icon 1102a, which causes the explorer panel 1110 to display a system view navigation tree 1112. This system view navigation tree 1112 comprises nodes 1116 representing automation systems that include one or more industrial controllers. The automation system nodes 1116 are given user-defined names and are organized in the system view navigation tree 1112 according to a user-defined hierarchical organizational schema to assist the user in locating a desired automation system in the tree 1112. In the illustrated example, the automation system nodes 1116 represent traffic light control systems, and so each system is given a name representing an intersection at which the traffic light control system will operate (e.g., StPaul_Jefferson, StPaul_Jackson, et al.). Each automation system node 1116 is classified under a location node 1114 representing a city in which the automation system will operate (e.g., Milwaukee, Montreal, Orlando, etc.), as well as any intermediate nodes 1104 classified under the location node 1114 representing more granular location information (e.g., a name of a neighborhood within the city represented by the location node 1114). The user can browse these various nodes to locate a desired automation system. Selectable arrow icons 1106 are displayed next to nodes within the tree 1112 having associated child nodes. Selection of an arrow icons 1106 toggles the visible states of the corresponding node's child nodes to be either hidden or visible.

Selection of one of the automation system nodes 1116 of the system view navigation tree 1112 causes content of the control project 502 associated with the corresponding automation system to be rendered in the workspace canvas 1118, or causes an appropriate panel to be rendered on the development interface 602 for display of the content (depending on the node selected and the corresponding content). If content has already been created for the selected automation system—e.g., control programming, data tag definitions, controller definitions 508, etc.—this content will be displayed for viewing and editing in the workspace canvas 1118. If new control programming is to be created for the selected automation system, the user can begin developing control logic and defining industrial controllers for the automation system via interaction with the workspace canvas 1118. As noted above, the control programming and data tag definitions that are to be installed and executed on the automation system's controllers can be developed in the IDE environment without initially binding the control programming to a specific controller definition 508, allowing the control code development to be decoupled from its hardware implementation until the user is ready to allocate the control code—in the form of a smart object instance 802—to a selected controller 118.

In contrast to industrial control development platforms in which a given control project permits creation of only a single controller definition 508 (that is, there is a one-to-one correspondence between the control project and its host industrial controller 118, represented by the project's controller definition 508), the scope of a control project 502 developed within the IDE system 302 can encompass multiple controllers 118 and multiple different automation systems. This is reflected in the format of the system view navigation tree 1112, in which any number of automation systems—represented by nodes 1116—can be created, each having one or more controller definitions 508.

Figure 12:
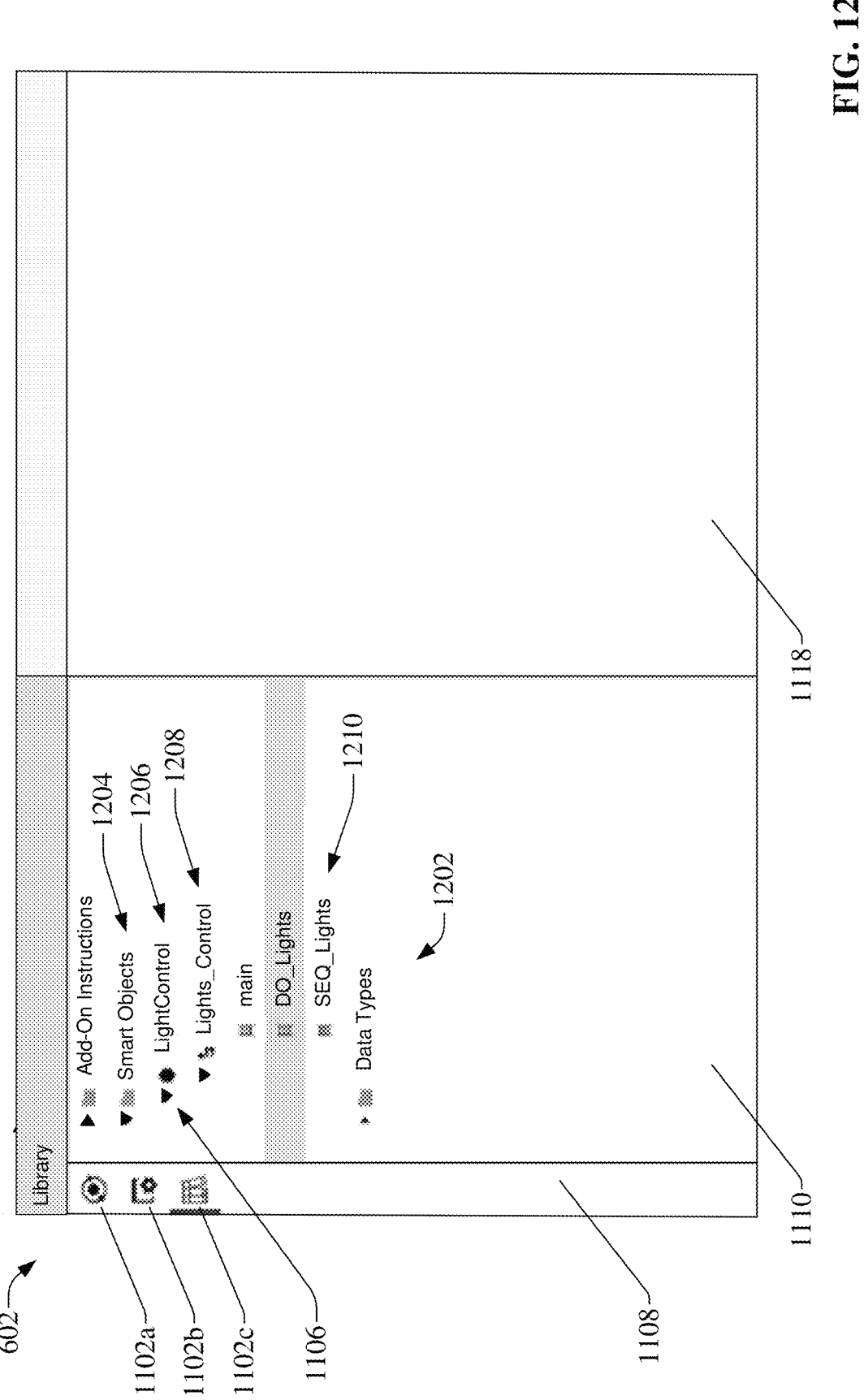
FIG. 12 is a segment of the example project development interface on which the Library view has been selected.

When control programming, data tag definitions, or other control configuration aspects are entered for an automation system defined in the current control project 502 (via interaction with the development interface 602), the project generation component 306 encapsulates that design input as a smart object definition 506. Smart object definitions 506 that have been defined for the control project 502 can be browsed and viewed in the interface's Library view. FIG. 12 is a segment of the example project development interface 602 on which the Library view has been selected. The Library view can be invoked by selecting the Library View explorer icon 1102*c*. In this view, the explorer panel 1110 displays a library view navigation tree 1202 that allows the user to browse smart object definitions 506 defined for the control project 502. The library view navigation tree 1202 comprises a main Smart Objects node 1204, below which one or more smart object nodes 1208 are organized as child nodes. As with the system view navigation tree 1112, the user can define one or more intermediate nodes 1206 below which the smart object nodes 1208 are organized, allowing the user to define a preferred navigation schema for locating desired smart object nodes 1208.

In the example illustrated in FIG. 12, a smart object definition 506 called Lights_Control has been created, and is represented by a smart object node 1208 in the navigation tree 1202. The Lights_Control smart object definition 506 comprises a control program made up of multiple control routines. Expanding the smart object node 1208, by selecting its corresponding arrow icons 1106, causes control routine nodes 1210 to be displayed below the smart object node 1208. These control routine nodes 1210 represent the control routines that make up the smart object definition 506 associated with the selected smart object node 1208. Selecting one of the control routine nodes 1210 causes the corresponding routine's control programming—e.g., ladder logic programming, function block diagram, structured text, etc.—to be displayed in the workspace canvas 1118 (the control programming is not shown in FIG. 12). Other aspects of the selected smart object definition 506, such as the data tag definitions associated with the control routines—can also be viewed and edited within the workspace canvas 1118 (or in separate window of the development interface 602) while the smart object node 1208 is selected. In general, selecting a smart object node 1208 from the navigation tree 1202 causes the development interface 602 to display the corresponding smart object definition 506— including the control programs and data tags for the selected smart object definition 506—in a format that can be viewed and edited by the user via interaction with the workspace canvas 1118.

Figure 13:
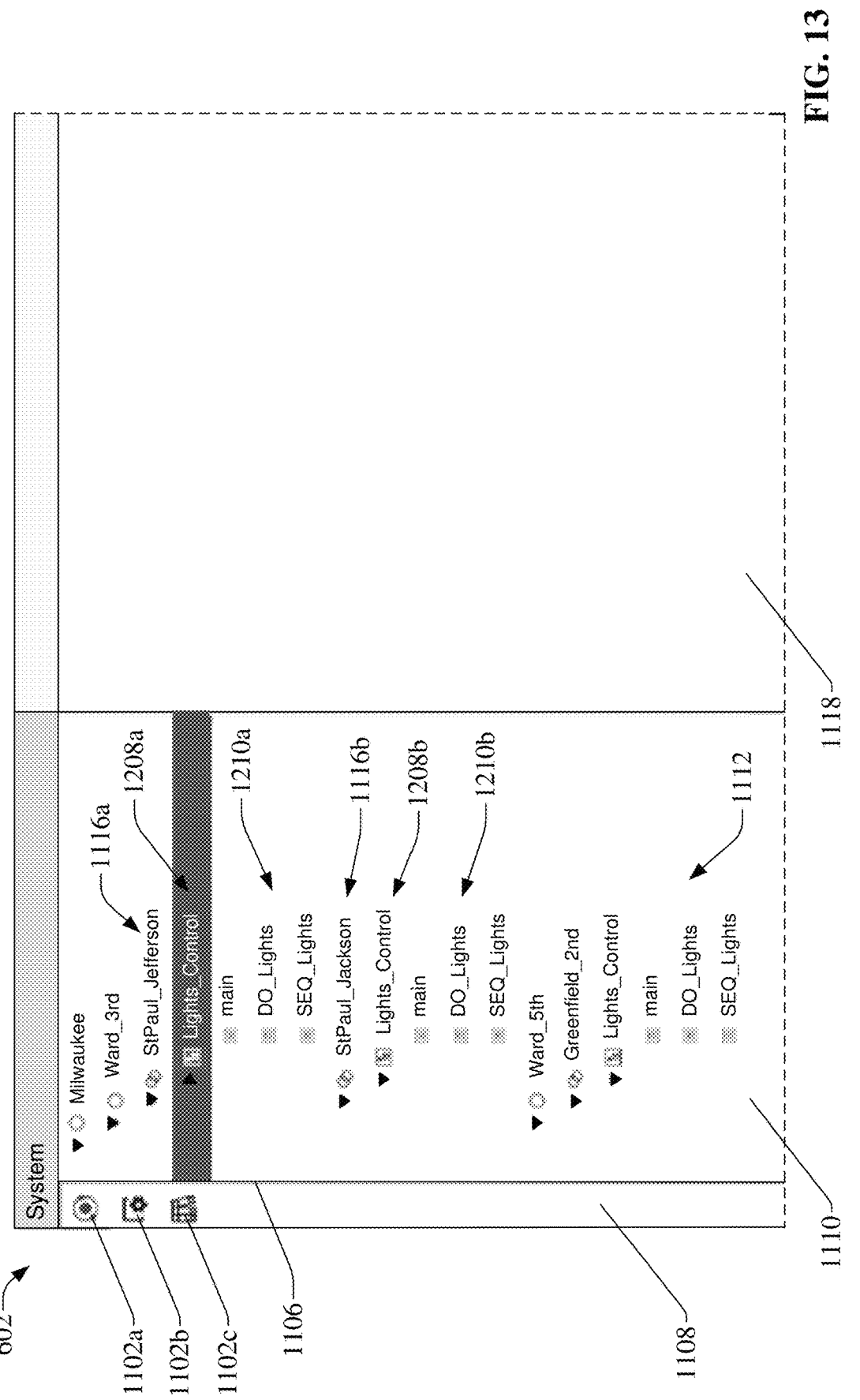
FIG. 13 is another view of the project development interface with the System view selected in which two instances of a Lights_Control smart object definition have been created for respective two automation systems.

FIG. 13 is another view of the project development interface 602 with the System view selected (similar to FIG. 11) in which two instances 802 of the Lights_Control smart object definition 506 have been created for respective two automation systems. The example project development interface 602 depicted in FIG. 13 allows the user to initiate the allocation of a smart object instance by selecting, from the system view navigation tree 1112, an automation system to be monitored and controlled by the smart object instance. In an example allocation workflow, the user can invoke a smart object selection window by right-clicking on the automation system node 1116 corresponding to the automation system to be controlled by the smart object instance, which invokes a window (not shown in FIG. 13) that lists the smart object definitions 506 that have been created for the control project 502. Selecting a smart object definition 506 from the list (e.g., Lights_Control) adds a smart object node 1208 and its associated control routine nodes 1210 to the navigation tree 1112 below the selected automation system node 1116. This workflow is only intended to be exemplary, and it is to be appreciated that other types of interactions for adding a smart object instance to an automation system are within the scope of one or more embodiments.

In the example depicted in FIG. 13, instances of the Lights_Control smart object definition 506 have been added to three automation systems, represented by automation system nodes 1116*a*, 1116*b*, and 1116*c*. This yields three copies of the Lights_Control smart object node 1208*a*,

1208*b*, and 1208*c*, each classified in the navigation tree 1112 below its corresponding automation system node 1116. Copies of the smart object's control routine nodes 1210*a*, 1210*b*, and 1210*c* are also added below their corresponding smart object nodes 1208.

Figure 14:
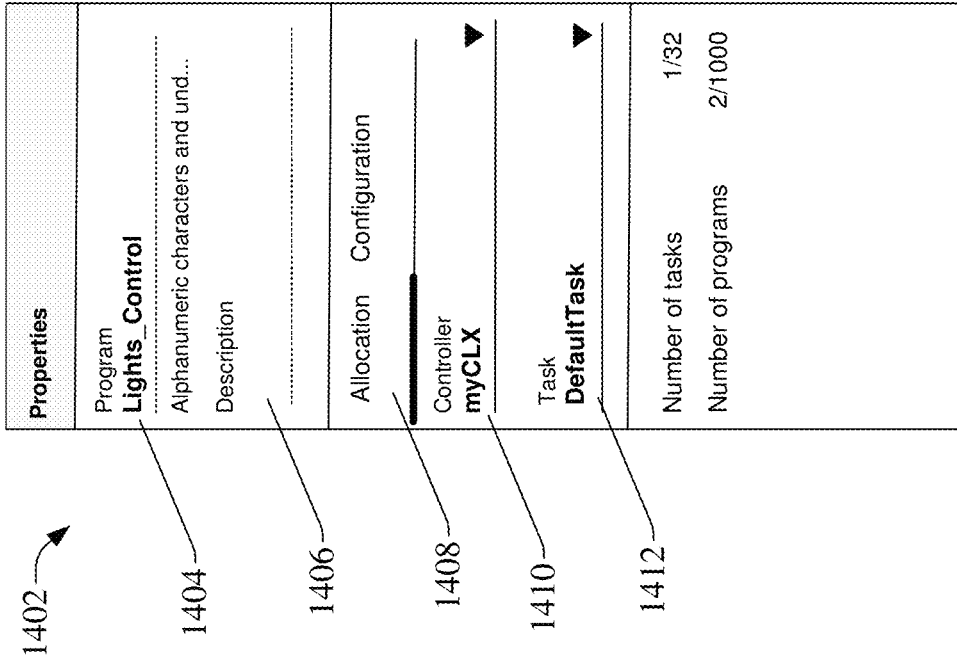
FIG. 14 is an example smart object properties window that can be rendered by the development interface, and which can be used to allocate an instance of a smart object definition to a controller definition.

Once the user has created one or more instances 802 of a smart object definition 506, those instances 802 can be allocated to selected controller definitions 508 corresponding to the industrial controllers 118 on which the smart object instances 802 will execute. The development interface 602 provides interactive tools that allow the user to allocate an instance 802 of any defined smart object definition 506 to one or more of the controller definitions 508. FIG. 14 is an example smart object properties window 1402 that can be rendered by the development interface 602, and which can be used to allocate an instance of a smart object definition 506 to a controller definition 508. The properties window 1402 for a smart object instance can be invoked, for example, by selecting the smart object node 1208 corresponding to the instance from the system view navigation tree 1112. Example properties window 1402 includes a Program field 1404 that displays the name of the selected smart object definition 506 (Lights_Control in the illustrated example) and a description field 1406 for entering a user-defined description for the smart object instance. Selecting an Allocation tab 1408 causes the properties window 1402 to render allocation fields for allocating the selected instance 802 of the smart object definition 506 to a selected controller definition 508. Controller field 1410 is a drop-down list populated by the names of the controller definitions 508 that have been created for the control project 502 by the user. Selecting a controller definition 508 from this controller field 1410 causes the project generation component 306 to allocate the selected smart object instance 802 to the selected controller definition 508. If the controller 118 represented by the selected controller definition 508 supports assignment of control routines to different tasks, the user can select the task to which the smart object instance 506 is to be assigned using a task field 1412.

The project generation component 306 updates the smart object binding definitions 504 to reflect the allocation defined by the user using the properties window 1402 (or another type of allocation interface). Specifically, the smart object binding definitions 504 record that a copy of the control program defined by the smart object definition 506 will be installed and executed on the industrial controller 118 represented by the selected controller definition 508. Allocated instances 802 of a smart object definition 506 can also be de-allocated from a controller definition 508 using the properties window 1402.

Figure 15:
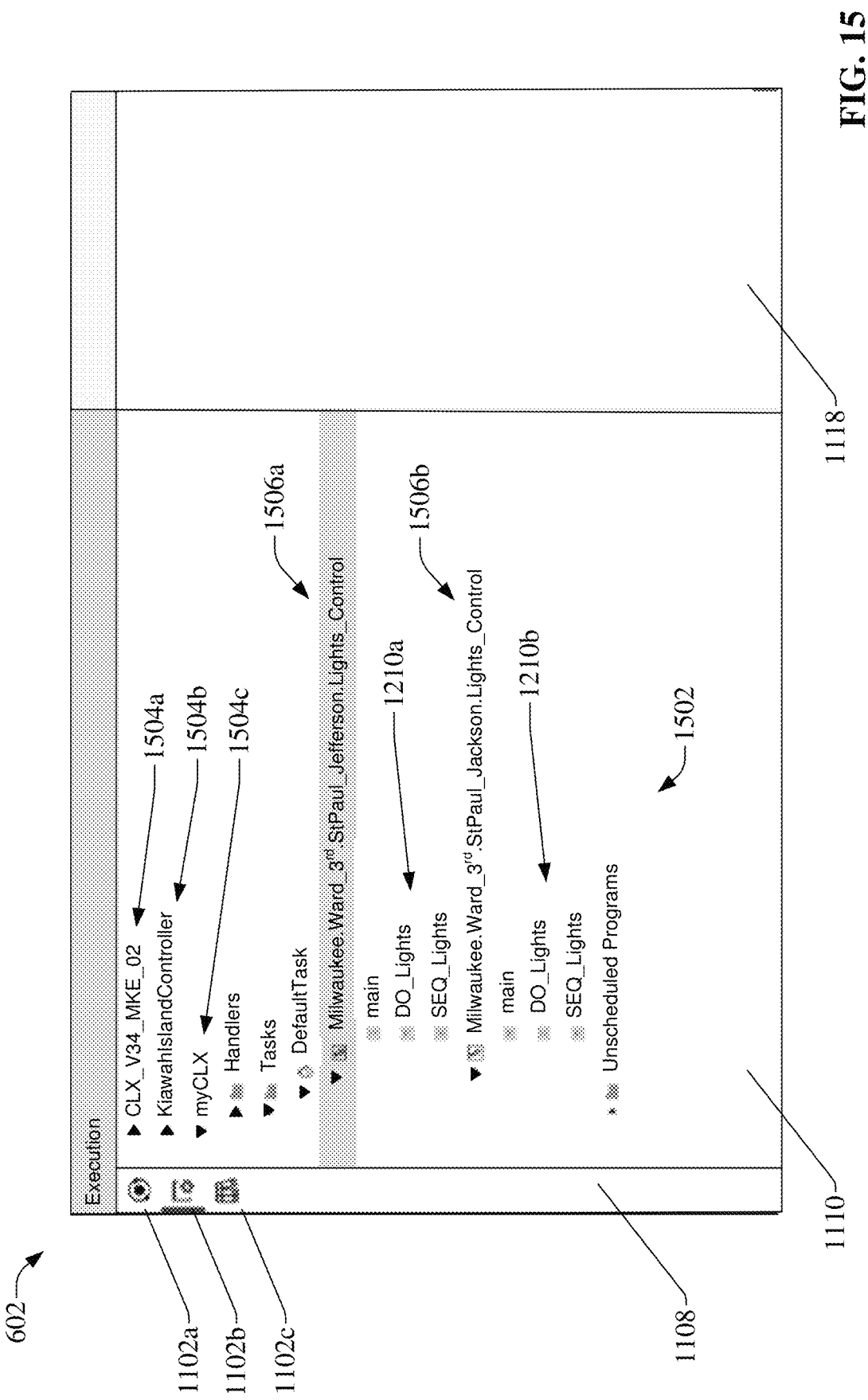
FIG. 15 is a segment of the example project development interface on which an Execution view has been selected.

FIG. 15 is a segment of the example project development interface 602 on which the Execution view has been selected. The Execution view can be invoked by selecting the Execution View explorer icon 1102*b*. In this view, the explorer panel 1110 displays an execution view navigation tree 1502 comprising controller nodes 1504 representing respective controller definitions 508 that have been created for the control project 502. In this example, the user has created three controller definitions for the control project 502, named XLX_V34_MKE_02, KiawahIslandController, and myCLX. These controller definitions are represented by controller nodes 1504*a*-1504*c*. As noted above, each controller definition 508 can specify information about an industrial controller 118 that will be commissioned as part of an automation system (e.g., an automation system represented in the System view illustrated in FIG. 11), including but not limited to a vendor and/or model of the industrial controller 118, a user-defined name of the controller 118, identities of I/O modules associated with the controller 118, installation locations of the I/O modules (e.g., controller chassis slot numbers in which each I/O module is installed), network settings for the controller 118, or other such information. Any controller definitions 508 created for the control project 502 by the user will appear in the execution view navigation tree 1502 as a controller node 1504. In some embodiments, the user can invoke details of a controller definition 508 by interacting with the controller node 1504 corresponding to the controller definition 508 (e.g., by right-clicking on the controller node 1504 to invoke a window or panel that displays the controller configuration, or by left-clicking on the controller node 1504 to display the details in the workspace canvas 1118).

Instances 802 of a smart object definition 506 that have been allocated to a controller definition 508—e.g., using the workflow described above in connection with FIGS. 13 and 14—appear in the execution view navigation tree 1502 as allocated smart object nodes 1506. Each allocated smart object node 1506 is organized in the navigation tree 1502 below the controller node 1504 to which the smart object instance 802 is allocated. Depending on the type of controller 118 represented by the controller node 1504, there may be one or more intermediate nodes organized hierarchically below the controller node 1504. In the example depicted in FIG. 15, controller node 1504c (representing the myCLX controller) has three child nodes representing different controller code categories—handlers, tasks, and unscheduled programs. Below the tasks node is a default task node, which is the task to which the smart object instance represented by node 1506a has been assigned. When an instance of a smart object definition 506 is allocated to a controller definition 508, the execution view navigation tree 1502 is updated to add the allocated smart object node 1506 under the appropriate controller node 1504, and to add the control routine nodes 1210 defined by the smart object definition 506 below the allocated smart object node 1506.

In the example configuration depicted in FIG. 15, two different instances of the Lights_Control smart object definition 506 have been allocated to the same controller myCLX. These two instances are represented by allocated smart object nodes 1506a and 1506b, respectively. As shown in FIG. 15, this yields two copies of the control routine nodes 1210a and 1210b below the controller node 1504 for the myCLX controller. This may be appropriate, for example, in scenarios in which a single controller 118 will be controlling two different but similar control systems.

In some embodiments, each allocated smart object node 1506 is given a fully qualified name that conveys not only the name of the smart object definition 506 from which the instance 802 was generated, but also the automation system for which the instance 802 was created; that is, the automation system that was selected from the system view navigation tree 1112 to initiate creation of the smart object instance 802, as described above in connection with FIGS. 11-13. According to an example naming standard, the qualified name for an allocated smart object node 1506 inherits the user-defined hierarchical naming schema used by the system view navigation tree 1112. Thus, in the illustrated example, the name of an allocated smart object node 1506 follows the format city.neighborhood.intersection.smart object which represents the hierarchical path to the smart object node 1208 in the system view navigation tree 1112. Allocated smart object node 1506a corresponds to smart object node 1208a in the system view navigation tree 1112, and allocated smart object node 1506b corresponds to smart object node 1208b.

Since allocated instances 802 are linked to their parent smart object definition 506, edits applied to the smart object definition 506 after one or more instances 802 of the smart object definition 506 have been allocated will be automatically propagated to the allocated instances 802. For example, if the user modifies, adds, or removes a control program from a smart object definition 506, the project generation component 306 will update all copies of the control programming associated with respective allocated instances 802 of the smart object definition 506.

Although the example allocation workflow described above in connection with FIGS. 11-15 only consider scenarios in which instances 802 of an entire smart object definition 506 are allocated to one or more target controller definitions 508, instances 902 of selected portions of a smart object definition 506 can also be allocated to respective different controller definitions 508 (as described above in connection with FIG. 9) via appropriate interactions with the development interface 602. Some embodiments of the development interface 602 can also allow the user to define parent-child relationships between smart object definitions 506, and to deploy portions of the resulting smart object hierarchy to respective different controller definitions 508, as described above in connection with FIG. 10.

Since the I/O available on a given industrial controller 118 may vary across different controller definitions 508 in terms of I/O addressing (which can depend on the arrangement of I/O modules defined for the controller 118), the IDE system 302 can support any suitable approach for resolving I/O mapping between I/O tags defined by a smart object instance 802 and the physical I/O defined by a controller definition 508 to which the instance is allocated. For example, in some embodiments I/O tags defined in a smart object definition 506 can be named using alias names rather than explicit I/O addresses. When an instance of the smart object definition 506 is allocated to a controller definition 508, the project generation component 306 can map each I/O tag defined by the smart object definition 506 to an available I/O point of the corresponding I/O type (e.g., analog input, analog output, digital input, digital output, etc.), as determined based on the I/O configuration defined in the controller definition 508.

The development interface 602 depicted in FIGS. 11-15 is only intended to be exemplary, and it is to be appreciated that any suitable control development interface that permits development of industrial control programs as smart object definitions without being initially bound to an industrial controller definition, and subsequent allocation of instances of those smart object definitions to controller definitions, is within the scope of one or more embodiments of this disclosure.

Figure 16:
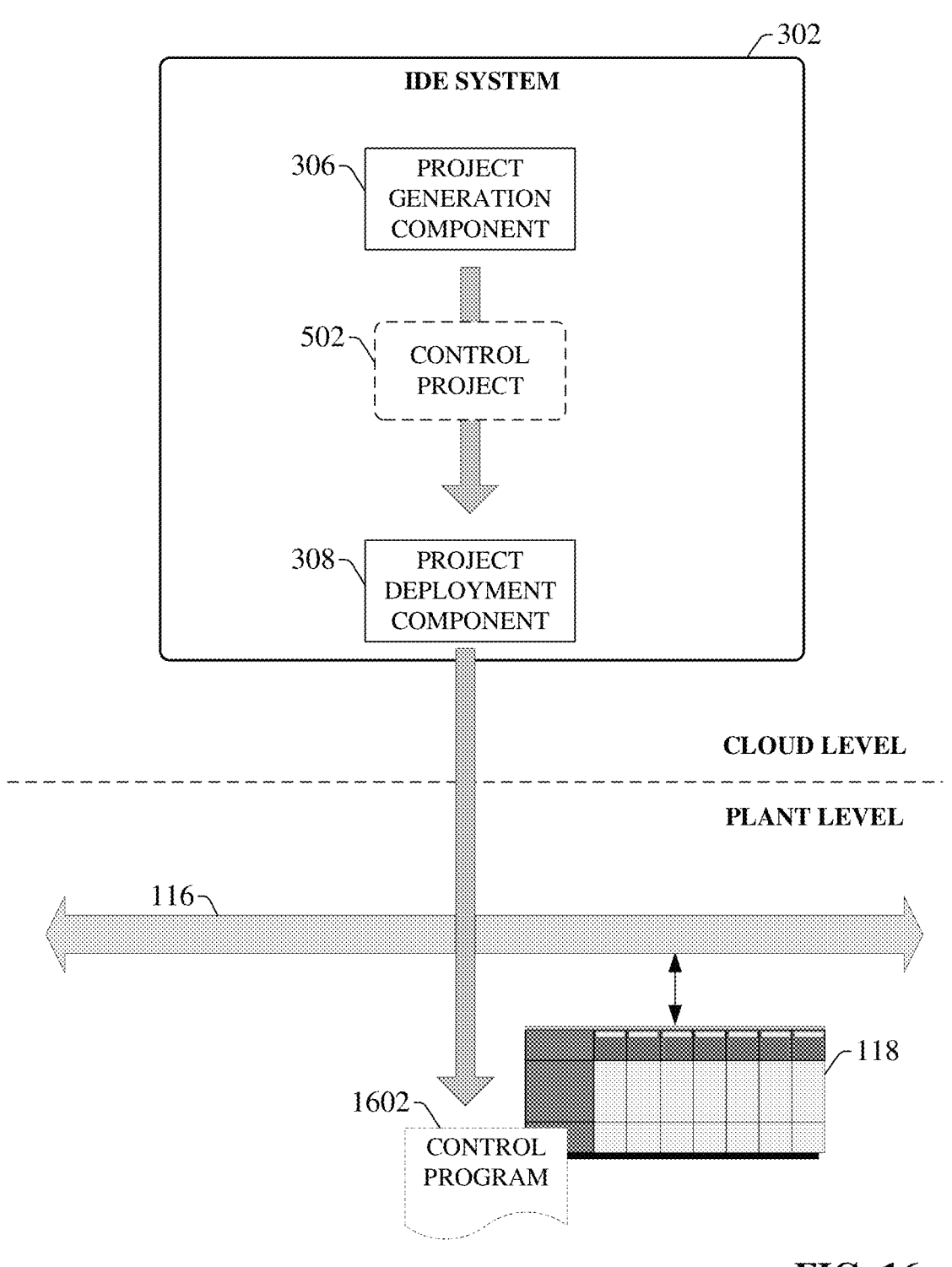
FIG. 16 is a diagram illustrating deployment of a control program to an industrial controller from a cloud-based embodiment of the IDE system.

Once an instance a smart object definition 506 has been allocated to a controller definition 508 within the control project 502 (resulting in a smart object binding definition 504 that records the allocation), the IDE system 302 can be used to deploy the corresponding control program and controller configuration information to the physical industrial controller 118 corresponding to the controller definition 508. FIG. 16 is a diagram illustrating deployment of a control program 1602 to an industrial controller 118 from a cloud-based embodiment of the IDE system 302. In this example, a target industrial controller 118 has been installed at a plant facility as part of an automation system (e.g., one of the automation systems defined in the system view illustrated in FIG. 11). The industrial controller 118 is connected to a plant network 116 (e.g., a common industrial protocol network, an Ethernet/IP network, etc.) that facilitates data exchange between industrial devices on the plant floor.

In this example, IDE system 302 resides on a cloud platform and executes as a set of cloud-based IDE service that are accessible to authorized remote client devices. The cloud platform can be any infrastructure that allows shared computing services to be accessed and utilized by cloud-capable devices. The cloud platform can be a public cloud accessible via the Internet by devices having Internet connectivity and appropriate authorizations to utilize the IDE system 302. In some scenarios, the cloud platform can be provided by a cloud provider as a platform-as-a-service (PaaS), and the IDE system 302 can reside and execute on the cloud platform as a cloud-based service. In some such configurations, access to the cloud platform and the IDE system 302 can be provided to customers as a subscription service by an owner of the IDE system 302. Alternatively, the cloud platform can be a private cloud operated internally by the industrial enterprise (the owner of the plant facility). An example private cloud platform can comprise a set of servers hosting the IDE system 302 and residing on a corporate network protected by a firewall.

If a control project 502 includes project elements that are ready for deployment—that is, if one or more controller definitions 508 have been allocated one or more instances 802, 902 of a smart object definition 506, as recorded in the one smart object binding definition 504—those elements of the control project 502 can be commissioned to their corresponding industrial controllers 118 via a secure connection between the plant network 116 and the cloud platform.

Embodiments of the IDE system 302 that support direct deployment to an industrial controller 118 (via one or more intervening public or private networks) include a project deployment component 308 that can translate selected portions of the control project 502 to an executable control program 1602 and deploy this program 1602 to the appropriate industrial controller 118. In an example deployment workflow, the IDE system's development interface 602 can allow the user to select a controller definition 508 corresponding to a physical controller 118 to be configured and programmed, and if the smart object binding definitions 504 indicate that the selected controller definition 508 has been assigned an instance 802 of a smart object definition 506 (or an instance 902 of a portion or aspect of a smart object definition 506, as illustrated in FIG. 9), the project deployment component 308 can translate the instance 802, 902 to a corresponding control program 1602 that is executable on the industrial controller 118. The executable control program 1602 comprises the controller configuration settings (e.g., I/O configuration settings, network settings, etc.) as well as the executable control program routines defined by the instance 802, 902 that have been allocated to the controller definition 508. The project deployment component 308 then sends the resulting control program 1602 to the industrial controller 118 via a communication channel between the IDE system 302 and the controller 118 (via any intervening public or private networks, network infrastructure devices, cloud gateway devices, or other such channel segments).

In some embodiments, the project deployment component 308 can perform validation checks on a requested deployment prior to translating and sending the control program 1602 to its corresponding controller 118, and the user interface component 304 can render warning notifications on the development interface 602 if these validation checks predict a potential runtime hazard or inconsistency as a result of the deployment. For example, if the user attempts to deploy an instance 902 of an aspect of a smart object definition 506—rather than an instance 802 of the entirety of the smart object definition 506—to the industrial controller 118, and the project deployment component 308 determines that one or more other aspects of the smart object definition 506 have not yet been allocated to a controller definition 508, the user interface component 304 can render a warning that the smart object definition 506 from which the aspect instance 902 was derived has not been completely allocated, and that the allocated aspect instance 902 may therefore not execute as intended. This notification may also specify the aspects of the smart object definition 506 that have not yet been allocated to a controller definition 508. In such scenarios, the project deployment component 308 may still permit the user to deploy the instance 902 to the controller 118 upon submitting a confirmation that deployment of the instance 902 is permitted regardless of the warning.

The example deployment architecture illustrated in FIG. 16 assumes a communication channel between the cloud-based IDE system 302 and the controller 118, which allows a user to initiate a direct deployment of an executable control program 1602 from the IDE system 302 to the hardware controller 118. However, in some scenarios it may not be practical to permit remote access to automation system devices, such as controller 118, from a cloud platform or other network external to the plant facility. To allow for deployment of control programs 1602 without the need to connect the controller 118 to the IDE system 302, some embodiments of the IDE system 302 can be configured to convert selected aspects of the control project 502 to a format supported by another control development application, allowing those project aspects to be viewed within, and deployed by, those development applications.

Figure 17:
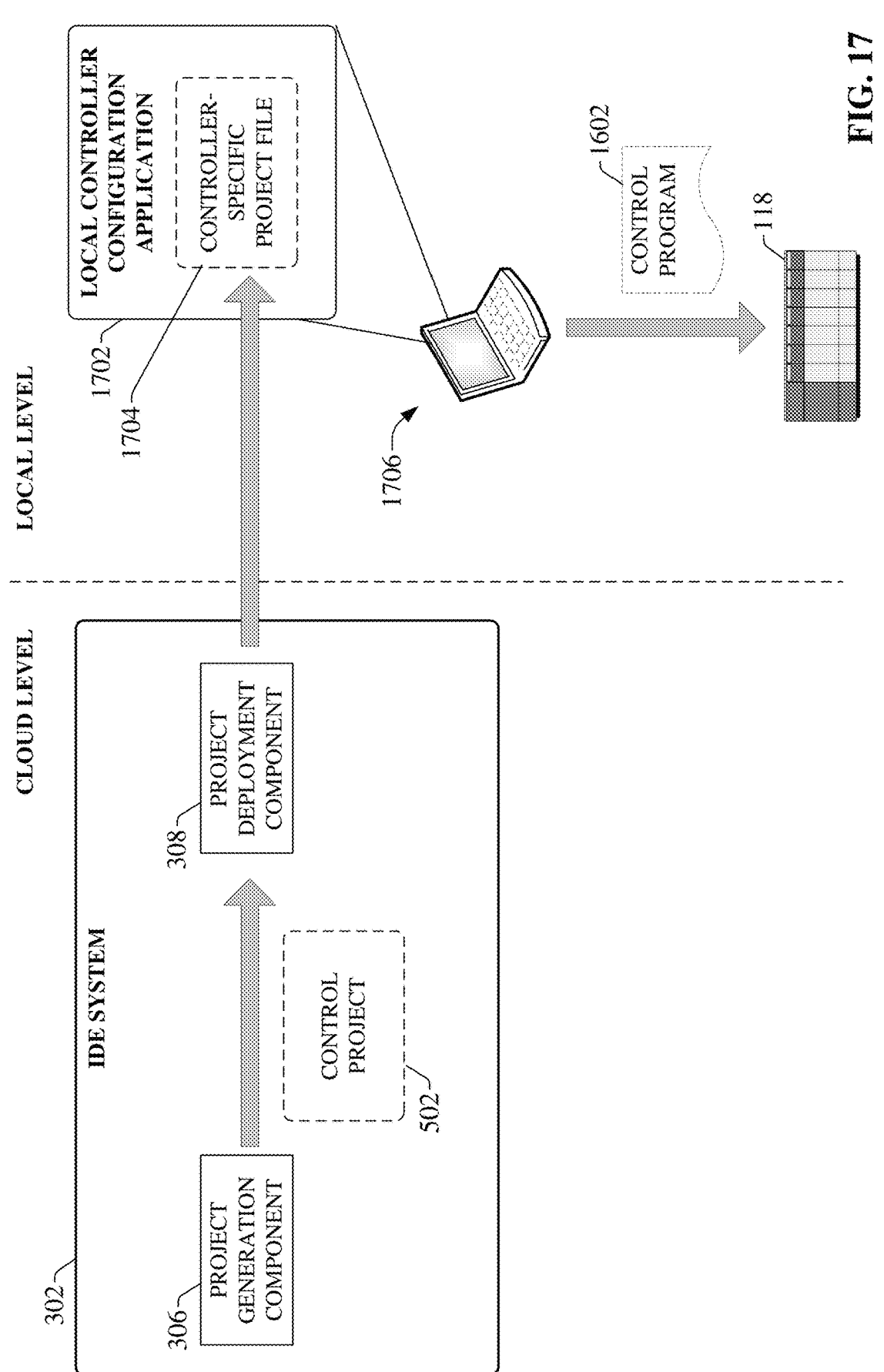
FIG. 17 is a diagram illustrating conversion of one or more aspects of a control project to a format supported by another industrial controller configuration application.

FIG. 17 is a diagram illustrating conversion of one or more aspects of a control project 502 to a format supported by another industrial controller configuration application 1702. In this example, a local controller configuration application 1702 executes on a client device 1706 (e.g., a laptop, desktop, or tablet computer; a mobile device, etc.) and renders a development platform with which users can create industrial control programs for industrial controllers 118. The configuration application 1702 may be, for example, a vendor-specific development platform for creating, viewing, editing, and downloading control programs for industrial controllers 118 sold by a particular vendor. In contrast to IDE system 302, which permits creation of multiple controller definitions 508 within a single control project 502, a control project created by the configuration application 1702 may be specific to only a single controller 118 for which the control programming is being developed.

In the illustrated example, the IDE system 302 can export portions of the control project 502 to the controller configuration application 1702 in a format that can be opened and viewed within the application 1702. As in the deployment example described above in connection with FIG. 16, the user can select a controller-specific aspect of the control project 502 to be exported by selecting a controller definition 508 to which an instance 802, 902 of a smart object definition 506 has been allocated (as defined by the smart object binding definitions 504). In this example, rather than translating the instance 802, 902 directly to a control program 1602 that is executable on the corresponding industrial controller 118, the project deployment component 308 translates the instance 802, 902 to a controller-specific project file

1704 having a format supported by the controller configuration application 1702. The resulting project file 1704 includes the controller configuration settings and control routines defined by the smart object instance 802, 902 that was allocated to the selected controller definition 508 (typically, only the aspects of the smart object that were allocated to the selected controller definition 508 will be exported). The file 1704 can be opened using the controller configuration application 1702 to allow a user to view these configuration settings and control routines using the configuration application's native development interfaces. If necessary, the project deployment component 308 can also convert any elements of the control program defined by the exported instance 802, 902 that are not supported by the target configuration application 1702—including unsupported data types, data tag types, or program instructions—to suitable supported elements understandable by the configuration application 1702.

To maintain familiarity with the original control project 502, the project deployment component 308 can create a name for the project file 1704 that includes the name of the originating smart object definition 506. The project deployment component 308 may also add metadata to the project file 1704 that provides additional information about the smart object from which the project file 1704 was derived, including but not limited to a library name, a version of the original smart object definition 506, allocation information identifying aspects of the smart object definition 506 that are not part of the exported project file 1704 (which can help to ensure that proper communication in a distributed control system is maintained), complete structure information for the original smart object definition 506 (e.g., hierarchical parent-child relationships defined for the smart object), or other such metadata.

The project deployment component 308 can export the project file 1704 either directly to the controller configuration application 1702 or to a specified storage location where the file 1704 can be retrieved and opened using the controller configuration application 1702. Since the project deployment component 308 exports project file 1704 in a format that is supported by the configuration application 702, opening the file 1704 using application 1702 renders the file's control program routines and controller configuration settings within the application's development interface. Since different control equipment vendors offer different configuration applications 1702 for programming their vendor-specific equipment, each of which may support a different project file format, some embodiments of the project deployment component 308 can select a target format for the project file 1704 that corresponds to the controller definition 508 that was selected for export, and generate the project file 1704 in a format that is compatible with the corresponding controller's configuration application 1702.

The configuration application 1702 includes communication tools for connecting to a physical industrial controller—either via a direct connection between the client device 1706 and the controller 118 or over a network—and downloading a control program 1602 to the controller 118 over the connection. These native communication tools can be used to compile the project file 1704 to an executable control program 1602 and download the program 1602 to the controller 118, thereby configuring and programming the controller 118 to perform the monitoring and control tasks defined by the original smart object instance 802, 902 from which the project file 1704 was derived.

Since the exported project file 1704 is fully supportable by the target configuration application 1702, a user can edit the exported project file 1704 using the configuration application's editing tools if desired before compiling the project file 1704 into an executable control program 1602. Since editing the project file 1704 within the configuration application 1702 creates a difference between the project file 1704 and its source smart object instance 802, 902, some embodiments of the IDE system 302 can allow an exported project file 1704 that has been edited outside of the IDE system 302 to be imported back into the control project 502, with the externally applied edits included in the import. In such embodiments, the project generation component 306 can update the original smart object definition 506 to reflect the edits that were made using the configuration application 1702. These updates may also be propagated to other allocated instances 802, 902 of the original smart object definition 506 if appropriate. In such embodiments, the IDE system 302 may prompt the user for confirmation that the imported edits are to be applied to other instances 802, 902 of the updated smart object definition 506, and will only apply the edits to those instances if confirmation is received from the user.

By allowing industrial control programs to be developed in a controller-agnostic manner as smart objects, instances of which can then be allocated to selected industrial controllers, the industrial IDE system 302 allows for a separation of control software development and hardware selection. The IDE system 302 also provides a simple and intuitive interface for reusing control programs across multiple controllers, since instances of a smart object can be allocated to any number of industrial controllers regardless of controller model. Since multiple controllers can be defined within a single control project 502 created within the IDE system's development platform, the IDE system 302 can also serve as a centralized environment for managing multiple automation systems, their associated industrial controllers, and the control programming deployed to each controller.

Figure 18A:
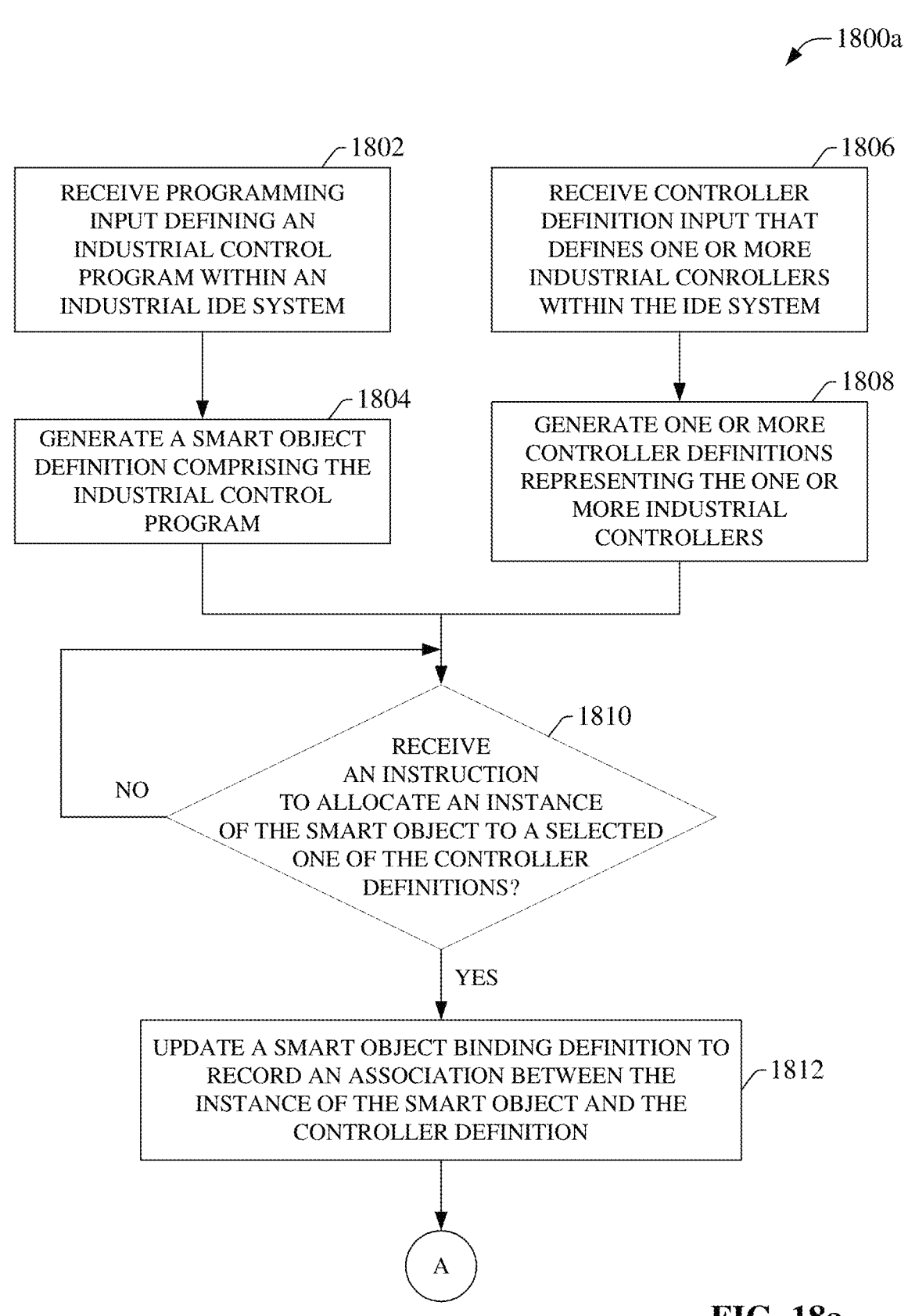
FIG. 18*a* is a flowchart of a first part of an example methodology for developing and deploying industrial control applications within a multi-controller project development platform.
Figure 18B:
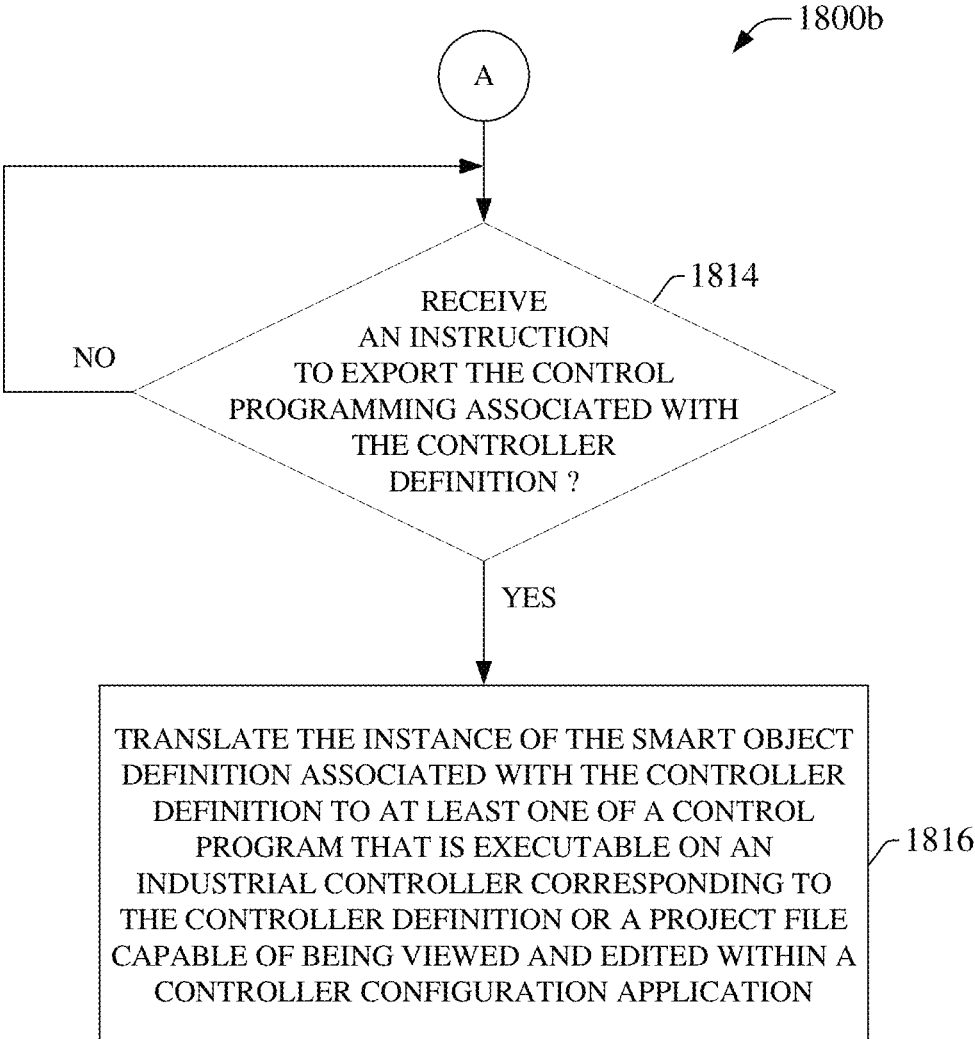
FIG. 18*b* is a flowchart of a second part of the example methodology for developing and deploying industrial control applications within a multi-controller project development platform.

FIGS. 18*a*-18*b* illustrate a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 18*a* illustrates a first part of an example methodology 1800*a* for developing and deploying industrial control applications within a multi-controller project development platform. At 1802, programming input defining an industrial control program is received within an industrial IDE system. The programming input can comprise, for example, ladder logic programming, function block diagram programming, structured text, control programming formatted as an industrial domain specific language (DSL), or another type of control programming format. The programming input can also define any data tags—e.g., I/O tags, or data tags of any appropriate data type—that will be used within the control program. The programming input can be received at step 1802 without the control program being initially linked to a specific industrial controller definition. That is, during development, the control program can be agnostic with regard to the specific industrial controller or controller type on which the program will be installed and executed.

At 1804 a smart object definition is generated by the industrial IDE system based on the industrial control program. The smart object definition can comprise the industrial control program defined at step 1802. Steps 1802 and 1804 can be used to define any number of smart object definitions within a single control project created using the industrial IDE.

As a separate workflow starting at step 1806, controller definition input defining one or more industrial controllers can be received within the IDE system. The controller definition input can specify such controller properties as an industrial controller vendor and model, I/O configuration settings for the controller (e.g., I/O module slot definitions, remote I/O definitions, etc.), networking settings for the controller, a name of the controller, or other such controller properties. At 1808, one or more controller definitions representing the one or more industrial controllers are generated based on the controller definition input received at step 1806. As in the case of smart object definitions, steps 1806 and 1808 can be used to create any number of controller definitions within a single control project created using the industrial IDE system.

If at least one smart object definition and at least one controller definition has been created within the control project using steps 1802-1804 and 1806-1808, a determination is made at step 1810 as to whether an instruction to allocate an instance of the smart object generated at step 1804 to a selected one of the controller definitions generated at step 1808 is received. According to an example workflow, the smart object definition can be represented as a smart object node within a navigation tree rendered by the IDE system's interface. If more than one smart object definition has been created, the navigation tree may render multiple smart object nodes corresponding to the respective smart object definitions in a browsable manner within the navigation tree. The user can select the smart object node corresponding to the smart object definition to be allocated, and can then select—e.g., via an invoked drop-down menu or another type of control—the controller definition to which an instance of the smart object is to be allocated. If an instruction to allocate an instance of the smart object is received (YES at step 1810), the methodology proceeds to step 1812, where a smart object binding definition is updated to record an association between the instance of the smart object and the controller definition, in accordance with the allocation instruction.

Any number of instances of the smart object definition generated at step 1804 can be allocated to respective different controller definitions that were generated at step 1808. Each instance of the smart object definition represents a copy of the control program defined by the smart object definition, and allocating the instance to a controller definition indicates that a copy of the control program is to be executed on the physical industrial controller represented by the controller definition. Also, instances of multiple smart object definitions can be allocated to a single controller instance, indicating that the corresponding industrial controller will be executing copies of the control programs defined by each of the smart object definitions.

Also, some embodiments of the IDE system can allow instances of different portions of a single smart object definition to be allocated to respective different controller definitions, thereby allowing the user to define a distribution of the control functionality represented by the smart object definition across multiple industrial controllers.

With at least one instance of a smart object definition allocated to a controller definition, the methodology then proceeds to the second part 1800b illustrated in FIG. 18b. At 1814, a determination is made as to whether an instruction is received to export the controller programming associated with the controller definition to which the instance of the smart object definition was allocated at step 1810. If such an export instruction is received (YES at step 1814), the methodology proceeds to step 1816, where the instance of the smart object definition that was allocated to the controller definition is translated either to a control program that is executable on an industrial controller corresponding to the controller definition or to a project file that is capable of being viewed and edited within a controller configuration application (e.g., a separate vendor-specific or equipment specific industrial control development platform). In the latter case, the IDE system can translate the smart object instance to a project file having a file format supported by the target configuration application.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
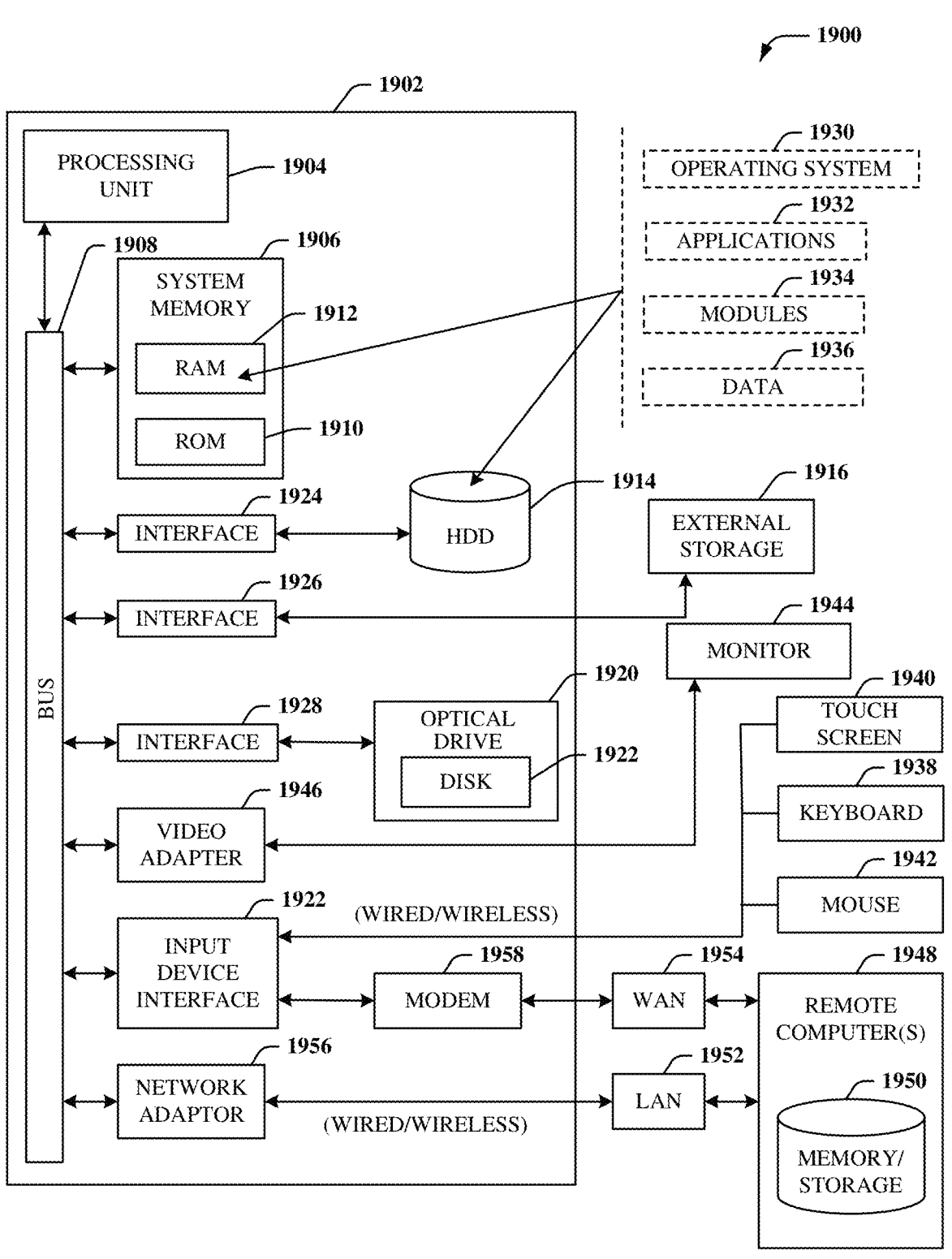
FIG. 19 is an example computing environment.
Figure 20:
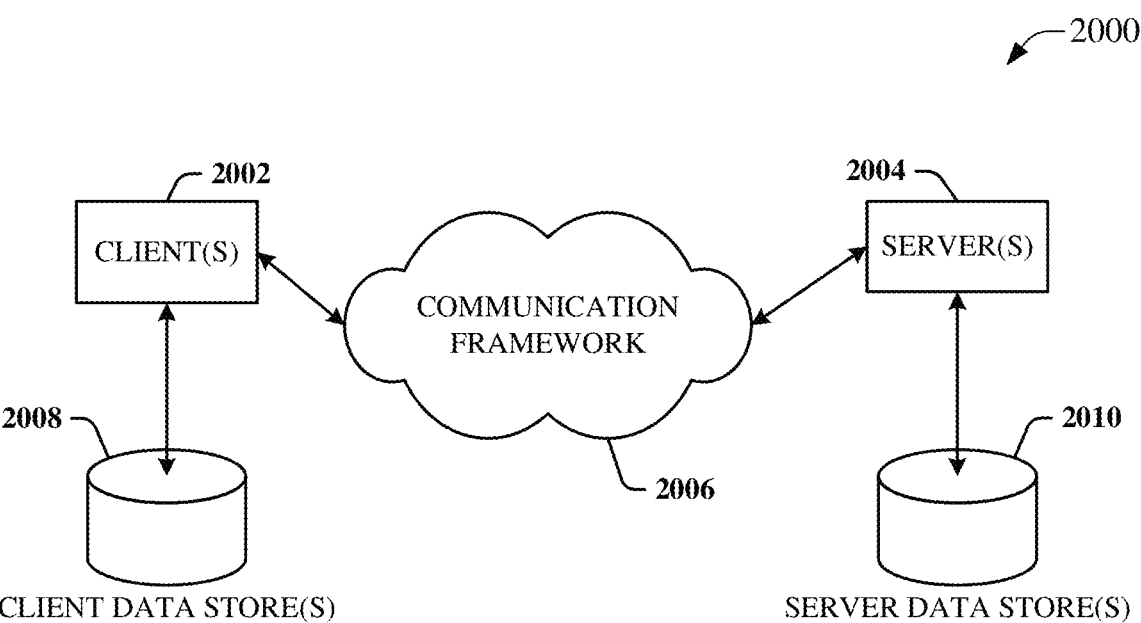
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and an optical disk drive 1920 (e.g., which can read or write from a CD-ROM disc, a DVD, a BD, etc.). While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and optical disk drive 1920 can be connected to the system bus 1908 by an HDD interface 1924, an external storage interface 1926 and an optical drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the.NET framework, for application programs 1932. Runtime environments are consistent execution environments that allow application programs 1932 to run on any operating system that includes the runtime environment. Similarly, operating system 1930 can support containers, and application programs 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1944 or other type of display device can be also connected to the system bus 1908 via an interface, such as a video adapter 1946. In addition to the monitor 1944, a computer typically includes other peripheral output devices (not shown), such as speakers, printers, etc.

The computer 1902 can operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1952 through a wired and/or wireless communication network interface or adapter 1956. The adapter 1956 can facilitate wired or wireless communication to the LAN 1952, which can also include a wireless access point (AP) disposed thereon for communicating with the adapter 1956 in a wireless mode.

When used in a WAN networking environment, the computer 1902 can include a modem 1958 or can be connected to a communications server on the WAN 1954 via other means for establishing communications over the WAN 1954, such as by way of the Internet. The modem 1958, which can be internal or external and a wired or wireless device, can be connected to the system bus 1908 via the input device interface 1922. In a networked environment, program modules depicted relative to the computer 1902 or portions thereof, can be stored in the remote memory/storage device 1950. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1952 or WAN 1954 e.g., by the adapter 1956 or modem 1958, respectively. Upon connecting the computer 1902 to an associated cloud storage system, the external storage interface 1926 can, with the aid of the adapter 1956 and/or modem 1958, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
   a user interface component configured to render a project development interface and to receive, via interaction with the project development interface, design input that defines an industrial control program and controller definitions as part of an industrial control project, wherein the controller definitions represent respective industrial controllers;
   a project generation component configured to
      create, based on the design input as part of the industrial control project, a smart object definition that represents the industrial control program, and
      allocate, in accordance with smart object allocation input received via interaction with the project development interface, multiple instances of the smart object definition to respective multiple controller definitions of the controller definitions; and
   a project deployment component configured to, in response to receipt of an instruction to export executable content associated with a controller definition, of the multiple controller definitions, translate an instance, of the multiple instances, allocated to the controller definition to a project file capable of being opened, viewed, and edited in a controller configuration application specific to a type of industrial controller defined by the controller definition,
      wherein execution of the project file on an industrial controller corresponding to the type configures the industrial controller to monitor and control an automation system in accordance with the industrial control program represented by the smart object definition.

2. The system of claim 1, wherein the project file comprises a copy of control routines and data tag definitions defined by the smart object definition.

3. The system of claim 1, wherein the project deployment component is further configured to assign a name to the project file based on a name of the smart object definition.

4. The system of claim 1, wherein the project deployment component is further configured to assign metadata to the project file indicating at least one of a version number of the smart object definition from which the industrial control program was obtained, a name of a smart object library of the industrial control project in which the smart object definition is stored, or a portion of the smart object definition allocated to the controller definition.

5. The system of claim 1, wherein
I/O tags of the industrial control program are written to be agnostic with regard to controller I/O addresses, and
the project generation component is configured to map, in the project file, the I/O tags of the industrial control program to available I/O addresses of the industrial controller represented by the controller definition to which the instance is allocated.

6. The system of claim 1, wherein
the project deployment component is configured to convert a program element defined by the instance of the smart object definition to an equivalent program element supported by the type of the industrial controller, and the program element is at least one of a data type or a program instruction.

7. The system of claim 1, wherein the project generation component is further configured to, in response to receipt, via interaction with the project development interface, of an instruction to allocate an instance of a portion of the smart object definition less than an entirety of the smart object definition to the controller definition, allocate the instance of the portion of the smart object definition to the controller definition.

8. The system of claim 7, wherein the project deployment component is configured to, in response to receipt of the instruction to export executable content associated with the controller definition, generate the project file to include a portion of the industrial control program represented by the portion of the smart object definition, wherein the portion of the industrial control program is less than an entirety of the industrial control program.

9. The system of claim 1, wherein the project generation component is further configured to, in response to receiving a version of the project file comprising edits applied by the controller configuration application, update the smart object definition in accordance with the edits.

10. The system of claim 9, wherein the project generation component is further configured to propagate the edits to one or more instances of the smart object definition that have been allocated to respective one or more of the controller definitions.

11. A method, comprising:

receiving, by a system comprising a processor via interaction with a project development interface, control programming input that defines an industrial control program;

defining, by the system as part of an industrial control project, a smart object definition representing the industrial control program based on the control programming input;

receiving, by the system via interaction with the project development interface, controller definition input that defines properties of multiple industrial controllers;

storing, by the system as part of the industrial control project, the controller definition input as controller definitions that respectively represent the multiple industrial controllers;

assigning, in accordance with smart object allocation input received via interaction with the project development interface, multiple instances of the smart object definition to respective multiple controller definitions of the controller definitions;

receiving, by the system, selection of a controller definition, of the multiple controller definitions, whose content is to be exported; and in response to the receiving of the selection, generating, by the system, a project file comprising the industrial control program defined by an instance, of the multiple instances, allocated to the controller definition, wherein the generating comprises generating the project file in a format capable of being opened, viewed, and edited in a controller configuration application compatible with a type of industrial controller defined by the controller definition, and execution of the project file on an industrial controller corresponding to the type configures the industrial controller to monitor and control an automation system in accordance with the industrial control program represented by the smart object definition.

12. The method of claim 11, wherein the project file comprises a copy of control routines and data tag definitions defined by the smart object definition.

13. The method of claim 11, wherein the generating further comprises assigning a name to the project file based on a name of the smart object definition.

14. The method of claim 11, wherein the generating further comprises assigning metadata to the project file indicating at least one of a version number of the smart object definition from which the industrial control program was obtained, a name of a smart object library of the industrial control project in which the smart object definition is stored, or a portion of the smart object definition allocated to the controller definition.

15. The method of claim 11, wherein
I/O tags of the industrial control program are written to be agnostic with regard to controller I/O addresses, and
the generating further comprises mapping, in the project file, the I/O tags of the industrial control program to available I/O addresses of the industrial controller represented by the controller definition to which the instance is allocated.

16. The method of claim 11, wherein
the generating further comprises converting a program element defined by the instance of the smart object definition to an equivalent program element supported by the type of the industrial controller, and
the program element is at least one of a data type or a program instruction.

17. The method of claim 11, further comprising, in response to receiving, via interaction with the project development interface, an instruction to allocate an instance of a portion of the smart object definition less than an entirety of the smart object definition to the controller definition, allocating, by the system, the instance of the portion of the smart object definition to the controller definition.

18. The method of claim 17, further comprising, in response the receiving of the selection, generating, by the system, the project file to include a portion of the industrial control program represented by the portion of the smart object definition, wherein the portion of the industrial control program is less than an entirety of the industrial control program.

19. A non-transitory computer-readable medium having stored thereon instructions that, in response to execution, cause a system comprising a processor to perform operations, the operations comprising:

receiving, via interaction with a project development interface, design input that defines an industrial control program and controller definitions as part of an industrial control project, wherein the controller definitions define properties of respective industrial controllers;

creating, by the system as part of an industrial control project, a smart object definition representing the industrial control program based on the design input;

assigning, in accordance with smart object allocation input received via interaction with the project development interface, instances of the smart object definition to selected controller definitions of the controller definitions;

receiving an instruction to export content associated with a selected controller definition of the controller definitions; and in response to the receiving of the instruction, translating an instance, of the multiple instances, allocated to the selected controller definition to a project file capable of being opened, viewed, and edited in a controller configuration application specific to a type of industrial controller defined by the controller definition, wherein execution of the project file on an industrial controller corresponding to the type configures the industrial controller to monitor and control an automation system in accordance with the industrial control program represented by the smart object definition.

20. The non-transitory computer-readable medium of claim 19, wherein the project file comprises a copy of control routines and data tag definitions defined by the smart object definition.

\* \* \* \* \*